June 13, 1961 A. M. NELSON ET AL 2,988,215

CARD PROCESSING SYSTEM

Filed Aug. 22, 1955 4 Sheets-Sheet 1

INVENTORS
ALFRED M. NELSON
HANS M. STERN
BY JEROME B. WIENER
Ellsworth R. Roston
ATTORNEY INVENTORS
ALFRED M. NELSON
HANS M. STERN
JEROME B. WIENER
BY Ellsworth R. Roston
ATTORNEY

CARD PROCESSING SYSTEM

Filed Aug. 22, 1955 4 Sheets-Sheet 3

INVENTORS
ALFRED M. NELSON
HANS M. STERN
BY JEROME B. WIENER
Ellsworth R. Roston
ATTORNEY

CARD PROCESSING SYSTEM

Filed Aug. 22, 1955 4 Sheets-Sheet 4

INVENTOR.
ALFRED M. NELSON
HANS M. STERN
BY JEROME B. WIENER
Ellsworth R. Roston
ATTORNEY 2,988,215
Patented June 13, 1961

2,988,215

CARD PROCESSING SYSTEM

Alfred M. Nelson, Redondo Beach, Hans M. Stern, Los Angeles, and Jerome B. Wiener, Granada Hills, Calif., assignors to The Magnavox Company, Los Angeles, Calif., a corporation of Delaware Filed Aug. 22, 1955, Ser. No. 529,886
23 Claims. (Cl. 209—72)

This invention relates to apparatus for processing stored information and more particularly to apparatus for sorting stored information in a logical pattern for use in data processing systems.

In recent years, the use of digital techniques has been initiated in a wide variety of fields. For example, digital techniques have been used in computers to solve complex mathematical problems. Digital techniques have also been used in a number of different systems for processing such data as inventory in a store or accounts in a bank. In such data processing systems, information as to many different items have to be sorted into a logical sequence. For example, the sales made by a department store in all of the different departments during a day have to be sorted into categories representing the different departments and into subcategories representing various items sold in each department.

In one type of data processing system, a plurality of cards have been used. Each card has been provided with a plurality of bits of different information. Since as many as millions of bits of different information may be required in a data processing system, thousands of cards may be required to store the information. One problem has been to sort the various cards into a logical sequence in accordance with the digital information on the cards. If the cards are not sorted into their proper logical sequence, the use of the cards in a data processing system is made considerably more difficult.

This invention includes a plurality of drums disposed in contiguous relationship to one another to pass the cards from one drum to the next. The cards are passed from one drum to the next by the operation of gates each disposed between a different pair of successive cards. In one position, each gate is adapted to provide a transfer of the cards from one of the associated drums to the other associated drum. Each gate is pivotable into a second position so that the cards will move on the first drum past the transfer position to a collecting station associated with the card.

Means are also included to control the pivotal disposition of each gate in accordance with the information on each card so that the card will pass to the proper collecting station. These means include electrical circuitry for reading the information on the cards and for actuating the gates in accordance with the information at selected positions on each card. By providing a plurality of drums and a plurality of collecting stations in association with the different drums to receive the cards in accordance with the information on the cards, a compact and reliable sorting system is obtained.

An object of this invention is to provide apparatus for use in a data processing system to sort a plurality of cards in accordance with the digital information at selected positions on the cards.

Another object is to provide apparatus of the above character which includes a plurality of collecting stations and means for controlling the pattern in which successive cards in a plurality are collected at the different stations.

A further object is to provide apparatus including a pair of drums and a pivotable gate disposed between the drums to control the transfer of information cards from one drum to the other.

Still another object is to provide apparatus including a plurality of drums and pivotable gates associated with the drums for transferring in one position information cards from one drum to the next and in another position for depositing the cards at collecting stations associated with the different drums.

Still another object is to provide apparatus including electrical circuitry for controlling the sorting of a plurality of cards into a number of different stations in accordance with information at selected positions on the cards.

Other objects and advantages will be apparent from a detailed description of the invention and from the appended drawings and claims.

In the embodiment of the invention shown in FIGURES 1 to 5, inclusive, a plurality of cards 10 (FIGURE 1) are arranged in stacked relationship such as a stack 12. The bottom edge of each card is adapted to rest on a flat surface such as the top of a table 14. The faces of each card 10 are disposed in a substantially vertical plane extending in a lateral direction along the top of the table 14.

Figure 1:
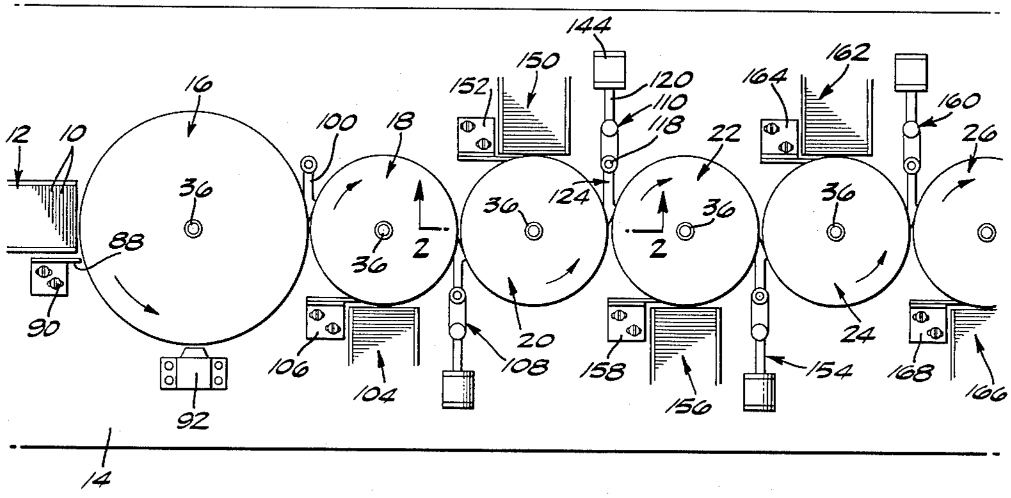
FIGURE 1 is a fragmentary top plan view of sorting apparatus constituting one embodiment of this invention and includes a plurality of drums and a plurality of pivotable gates associated with the drums for controlling the transfer of information cards from one drum to the next.
Figures 5, 6:
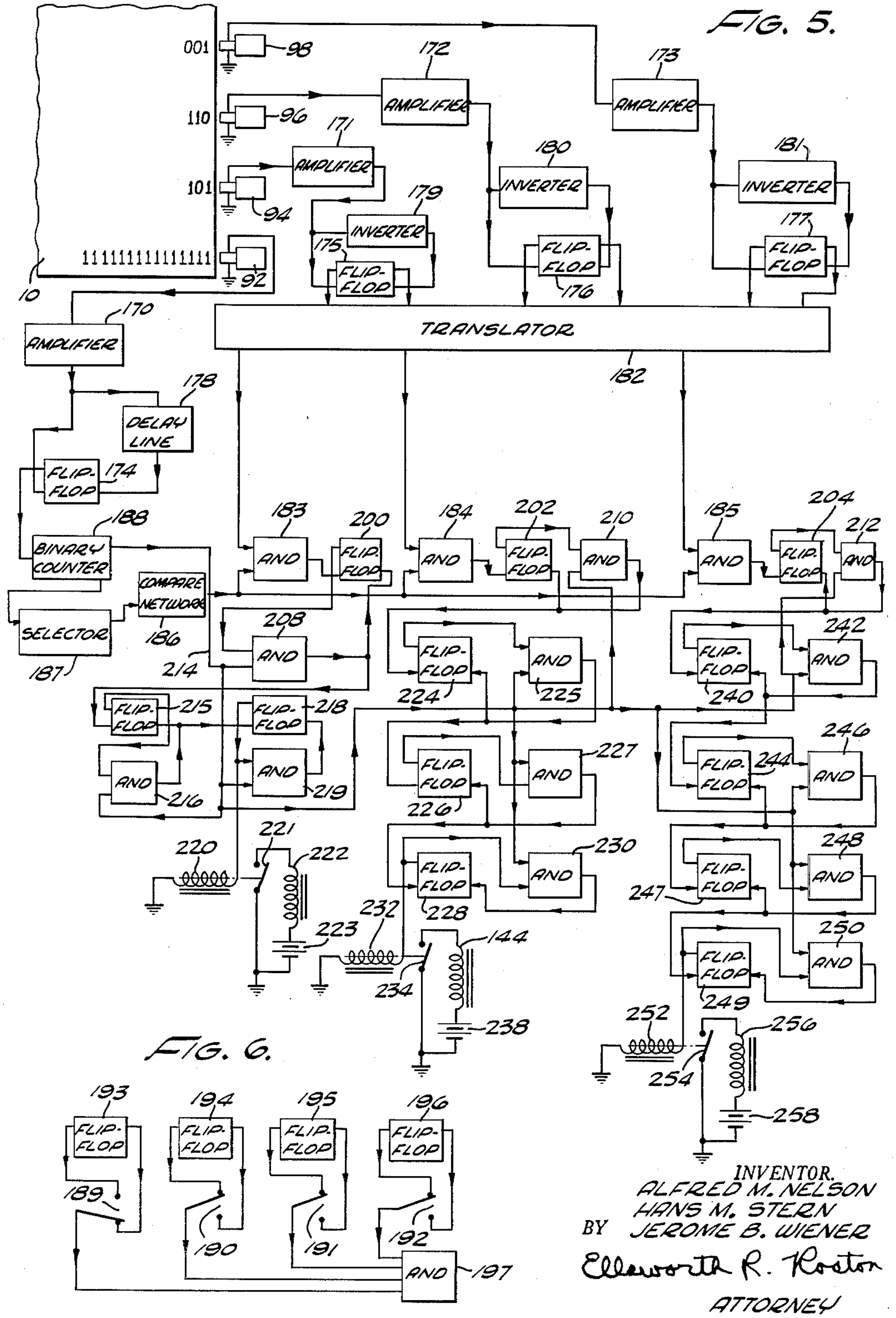
FIGURE 5 is a diagram, partly in block form, somewhat schematically illustrating electrical circuitry for controlling the pivotal disposition of the various gates shown in FIGURE 1.
FIGURE 6 is a diagram, partly in block form, somewhat schematically illustrating in further detail certain of the stages shown figuratively in FIGURE 5.

As shown in FIGURE 5, each card 10 is provided with a plurality of bits of information. Each bit of information by itself or in combination with other bits represents information in digital form. This information may relate to numbers, alphabetic letters, combinations of numbers and letters (alpha-numeric coding) or any other pertinent matter. The bits of information may be disposed in rows each of which extends in a lateral direction in FIGURE 1. Because of the different angle at which one of the cards 10 is shown in FIGURE 5, the rows are shown as extending horizontally in that figure. In FIGURE 1, the rows of information would extend in a lateral direction because of the manner in which the cards are shown as being positioned in that figure.

The bits of information may be provided in any suitable form on the card 10. For example, the information may be represented by holes or the absence of holes at the different positions. Preferably, the information is represented in magnetic form. In this form, magnetic fluxes of one polarity at a position may represent an indication of "0" or a false state and magnetic fluxes of an opposite polarity at a position may represent an indication of "1" or a true state.

Only one face of each card 10 may be magnetically polarized in the different information positions to represent various bits of binary information or both faces may be magnetically polarized in this manner. By polarizing both faces of each card, the number of cards required to store a particular amount of information can be substantially halved. The information on one side of the card will not interfere with the information on the other side of the card if the card is sufficiently thick.

A plurality of drums are disposed relative to one another and to the stacked cards 10 such that the cards can be moved individually from one end of the stack along successive drums and disposed in the various stacks associated with the different drums. For purposes of illustration, a plurality of drums 16, 18, 20, 22, 24 and 26 are shown in FIGURE 1. However, it will be understood from the subsequent discussion that any number of drums may be used. The drums 18, 20, 22, 24 and 26 are preferably adapted to rotate at a surface speed greater than that of the drum 16 to provide for a proper transfer of the cards between drums and to provide for an optimum sorting operation.

The drums 16, 18, 20, 22, 24 and 26 are all provided with a similar construction. For this reason, the construction of the drum 20 is shown in detail in FIGURE 2 and will be described fully subsequently. It is believed that this will indicate the construction of the other drums shown in FIGURE 1. The drum 20 includes a pair of exterior plates 27 (FIGURE 2) defining a housing and having inwardly disposed lip portions 28 at their peripheries. A second pair of plates 30 are disposed within the compartment defined by the plates 27 and are suitably disposed in spaced relationship to the plates 27 as by spacers 32 mounted on studs 34. The studs 34 extend through the plates 27 and 30 at positions near the peripheries of the plates to maintain the plates in fixed position relative to one another. A plug 36 also extends into a threaded socket in the upper plate 27 at the annular center of the plate.

The radius of the plates 30 is slightly less than that of the plates 27 by a distance corresponding substantially to the thickness of the cards 10 so as to form a neck portion 38 relative to the periphery of the plates 26. Each of the plates 30 has annular flange portions 40 extending axially from both faces of the plate 30 at the periphery of the plate. The flange portions 40 are so formed as to produce slots between the plates 30 and between the flanges on the plates 30 and the lip portions 28 on the plates 27. The slots 42 communicate with suction passageways 46 formed between adjacent plates by the inclusion of the spacers 32.

The drum 20 is disposed against an annular collar 52 provided at one end of a hollow shaft 54. Bearings 56 are provided at opposite ends of the shaft 54. The inner races of the bearings 56 are mounted on the shaft and the outer races of the bearings are disposed against bushings 58 secured to a housing 60 as by studs 62. Seals 64 are disposed at opposite ends of the bearings to prevent the leakage of lubricating fluid from the bearings.

A hole 66 is provided in the housing 60 at a position between the bearings 56. The hole 66 is provided so that a belt 68 can extend into the housing and around a pulley 70. The pulley 70 is suitably positioned within the housing 60 as by sleeves 72 mounted on the shaft 54 between the bearings 56. In this way, the shaft 54 can be rotated by a suitable motor (not shown).

The bearings 56 and the sleeves 72 are maintained in fixed position on the shaft 54 as by a lock washer 74 and a nut 76. The nut 76 is adapted to be screwed on a threaded portion at the bottom of the shaft 54. A sealing disk 78 is also adapted to be screwed on the threaded portion of the shaft 54. The sealing disk 78 operates in conjunction with a bottom plate 80 to prevent movement of air between the interior of the housing 60 and the interior of the hollow shaft 54 upon a difference in pressure between the housing and the shaft.

The plate 80 is secured to the housing 60 as by studs 82. A hollow conduit 84 is in turn disposed as by a push fit within the plate 80. In this way, air can be exhausted from the hollow interiors of the shaft 54 and the conduit 84 as by a vacuum pump 86. Although the pump 86 is shown in block form in FIGURE 2, it should be appreciated that any suitable type of pump can be used.

Although the drum 16 is shown in FIGURE 1 as having a greater diameter than the other drums, it should be appreciated that the drum 16 may have any suitable diameter. The drum 16 is disposed in frictional relationship with the cards 10 at one end of the stack 12 such as the right end in FIGURE 1. A throat member 88 is disposed in contiguous relationship to the periphery of the drum 16. The throat member 88 is disposed at a position near the stack but angularly removed from the stack in the direction of rotation of the drum. When the drum 16 rotates in a counterclockwise direction as shown in FIGURE 1, the throat member 88 is displaced in a counterclockwise direction from the stack 12. The throat member 88 is adjustably positioned relative to the periphery of the drum as by elongated slots and screws 90 extending through the slots into the table 14.

As shown in FIGURES 1 and 5, a plurality of transducing members are disposed in contiguous relationship to the drum 16. Four transducing members are indicated at 92, 94, 96 and 98 in FIGURES 1 and 5 but it should be appreciated that any other number of transducing members can be used in accordance with the number of different rows of information on the cards 10. The transducing members such as the members 92, 94, 96 and 98 are disposed in contiguous relationship to the periphery of the drum 16 at a position removed from the throat member 88 in the direction of rotation of the drum. In FIGURE 1, the transducing member 92 is shown as being displaced in a counterclockwise direction from the throat member 88.

Each of the transducing members such as the members 92, 94, 96 and 98 is provided with magnetic means such as a coil. The coil in each transducing member is so disposed as to be magnetically coupled to the cards 10 during the movement of the cards past the transducing member on the periphery of the drum 16. As will be described in detail subsequently, the transducing members 92, 94, 96 and 98 are connected to "read" the magnetic indications on the different cards and to convert these magnetic indications into a corresponding pattern of electrical signals.

The transducing members 92, 94, 96 and 98 or other members may also be connected to record magnetic information on the cards 10 by converting electrical signals into a corresponding pattern of magnetic signals on the cards. Transducing members are shown in the drawings as being associated only with the drum 16. However, other transducing members may be associated with any or all of the other drums as described in copending application Serial No. 505,248, filed May 2, 1955 by Alfred M. Nelson and Hans M. Stern.

A gate 100 is disposed in contiguous relationship to the drums 16 and 18. The gate 100 is disposed relative to the drum 16 at a position removed from the transducing member 92 in the direction of rotation of the drum. Since the drum 16 is shown in FIGURE 1 as rotating in a counterclockwise direction, the gate 100 is displaced in this direction from the transducing member 92. The gate 100 is fixedly positioned relative to the drums 16 and 18 for reasons which will be described in detail subsequently. Although a fixed gate similar to the gate 100 is not shown in detail in the drawings, it may be deduced by a person skilled in the art from the construction of one of the pivotable gates shown in FIGURES 3 and 4. The construction and operation of a gate similar to the gate 100 is also shown in detail in copending application Serial No. 505,248.

The drum 18 is adapted to rotate in an angular direction opposite to that of the drum 16. For this reason, the drum 18 is shown in FIGURE 1 as rotating in a clockwise direction. A stack 104 is disposed in contiguous relationship to the periphery of the drum 18 at a position removed from the gate 100 in the direction of rotation of the drum. The stack 104 is also angularly positioned in the direction of rotation of the drum 18 past the position at which the drum 18 is contiguous with the drum 20. A throat member 106 is also disposed in contiguous relationship to the periphery of the drum 18 at a position near the stack 104 but angularly removed from the stack in the direction of rotation of the drum. The throat member 106 is adjustably positioned relative to the periphery of the drum 18 to interrupt the movement of the cards 10 on the drum 18 so that the cards will become deposited in the stack 104. This may be accomplished by providing the throat member 106 with fingers which extend into the slots 42 in the drum 18.

A pivotable gate 108 extends between the drums 18 and 20 to a position contiguous to both drums. In this way, the gate 108 is disposed in contiguous relationship to the drum 18 at a position angularly closer to the gate 100 than the stack 104 in the direction of rotation of the drum. The gate 108 is constructed in a manner similar to a gate 110 which is disposed between the drums 20 and 22 and which is shown in detail in FIGURES 3 and 4. For this reason, a detailed description as to the construction and operation of the gate 110 should suffice for a proper understanding as to the construction and operation of the gate 108. For optimum operation of the system, the peripheral distance on the drum 18 between the gates 100 and 108 should be at least as great as the length of each card 10. This is also applicable to the peripheral distance between successive pairs of gates.

Figures 3, 4:
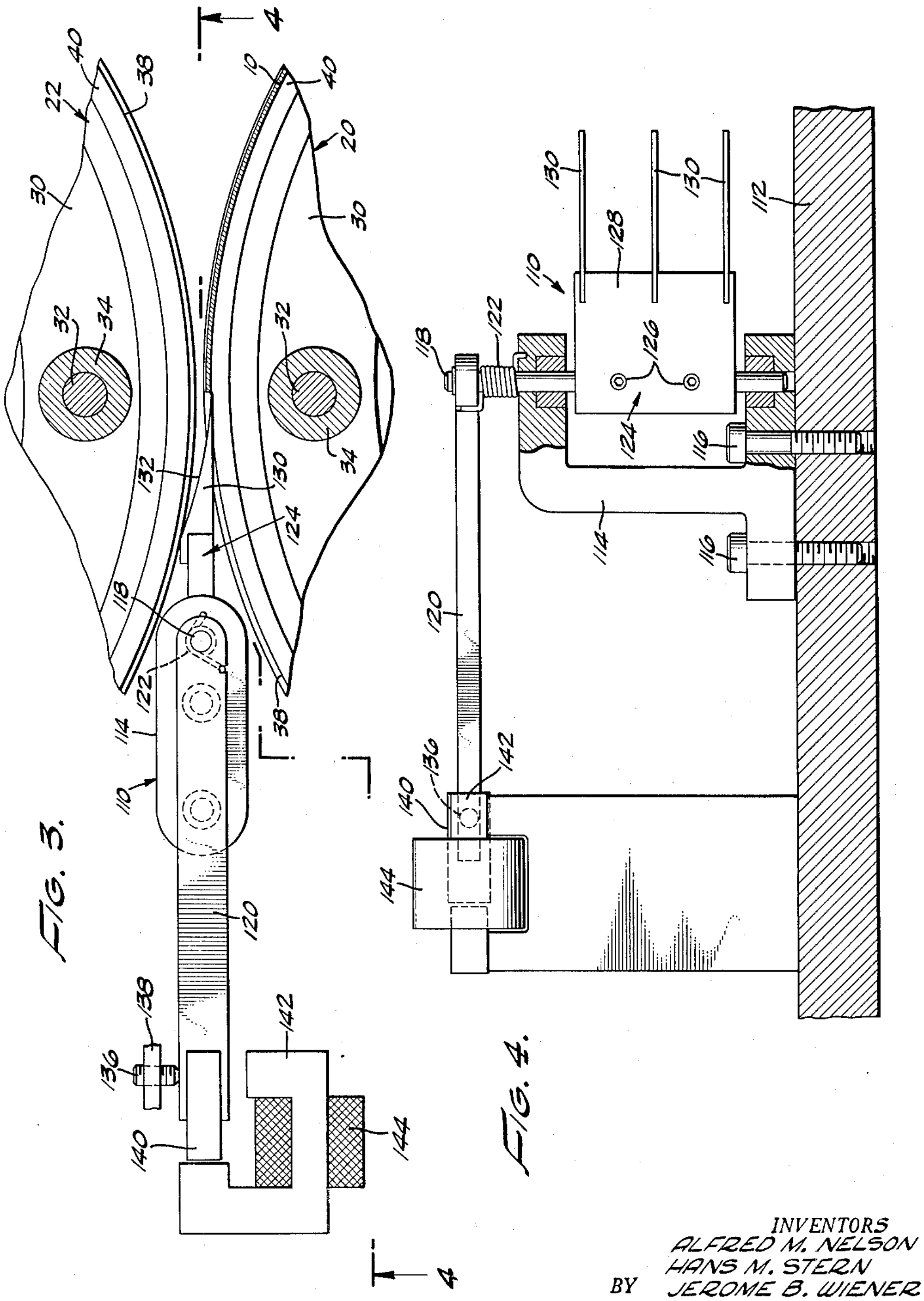
FIGURE 3 is an enlarged fragmentary sectional view substantially on the line 3—3 of FIGURE 2 and shows in further detail the construction and disposition of a pair of drums and of one of the pivotable gates shown in FIGURE 1.
FIGURE 4 is an enlarged fragmentary sectional view substantially on the line 4—4 of FIGURE 3 and illustrates in further detail the construction of the gate shown in FIGURE 3 and the disposition of the gate relative to an associated drum.

As shown in FIGURES 3 and 4, the gate 110 includes a base 112 which supports a C-shaped brace 114 as by threaded studs 116. A pivot pin 118 extends downwardly through a rod 120 and through the horizontal legs of the C-shaped brace 114. A helical spring 122 is supported on the pivot pin 118 between the rod 120 and the upper leg of the brace 114. The spring 122 is fixedly held at opposite ends by the brace and the rod to become constrained upon a rotation of the pin 118.

A sleeve 124 is fixedly positioned on the pivot pin 118 as by studs 126 which screw into the sleeve to press against the pin. The sleeve has a rib portion 128 which supports fingers 130. Each finger 130 tapers inwardly as at 132 in FIGURE 3 as it extends from the rib portion 128 of the sleeve 124. In this way, the fingers 130 are disposed in contiguous relationship to the periphery of the drum 22 at a position laterally near the rib portion 128 of the sleeve 124. At its outer extremity, the fingers 130 are able to extend in one position into the slots 42 in the drum 20 at a position radially interior to the disposition of the cards 10 on the drum.

At its left end as shown in FIGURE 3, the rod 120 is disposed in contiguous relationship to a stop 136 supported by a bar 138 in adjustable relationship to the bar. As will be described in detail subsequently, the stop 136 limits the pivotal movement of the rod 120 and the pin 122 in a clockwise direction. The rod 120 carries at its left end an armature 140 disposed in magnetic proximity to a magnet 142. The magnet 142 has one pole positioned on the opposite side of the rod 120 from the stop 136 so as to exert when energized an attractive force for pivoting the rod 120 away from the stop 136. The magnet 142 is adapted to be energized by a coil 144 suitably wound on the magnet.

The drum 20 in FIGURE 1 is adapted to rotate in a direction opposite to the drum 18. Since the drum 18 rotates in a clockwise direction, the drum 20 rotates in a counterclockwise direction. A stack 150 is disposed in contiguous relationship to the drum 20 at a position past the gate 110 in the direction of rotation of the drum. An adjustable throat member 152 is disposed in contiguous relationship to the periphery of the drum 20 at a position past the stack 150 in the counterclockwise direction. The throat member 152 may have fingers extending into the slots 42 in the drum 20 to interrupt the movements of the cards on the drum.

The drum 22 is rotatable in a direction opposite to the drum 20. This causes the drum 22 to rotate in a clockwise direction. In the clockwise direction, a pivotable gate 154 corresponding to the gates 108 and 110 is adapted to provide a first interruption in the movement of the cards 10 on the periphery of the drum. A stack 156 and an adjustable throat member 158 are disposed in co-operative relationship to each other and to the periphery of the drum 22 to provide an interruption in the movements of the cards 10 on the periphery of the drum after the movement of the cards past the gate 154.

The gate 154 is disposed in contiguous relationship to the drum 24 as well as to the drum 22. The drum 24 is adapted to rotate in an opposite—or counterclockwise—direction relative to the rotation of the drum 22. In this direction of rotation, a pivotable gate 160 is adapted to provide a first interruption in the movement of the cards on the periphery of the drum 24. A stack 162 and an adjustable throat member 164 are adapted to co-operate with each other for providing a subsequent interruption in the movement of the cards on the drum. The gate 160, the stack 162 and the throat member 164 correspond in construction and operation to the gate 108, the stack 104 and the adjustable throat member 106, respectively.

The gate 160 is adapted in one position to couple the drums 24 and 26. A pivotable gate (not shown), a stack 166 and an adjustable throat member 168 are associated with the drum 26 in a manner similar to the association between the drums 18, 20, 22 and 24 and corresponding members disposed in contiguous relationship to each drum. In like manner, pivotable gates, stacks and adjustable throat members may be associated with drums sequential to the drum 26 and not shown in the drawings for purpose of simplification. It should be appreciated, however, that the pivotable gates such as the gate 110 is only one form of apparatus which may be used to control the transfer of cards from one drum to the next.

In FIGURE 5, electrical circuitry is shown for controlling at any instant the pivotal disposition of the various gates such as the gates 108, 110, 154 and 160 in FIGURE 1. The electrical circuitry includes the transducing members 92, 94, 96 and 98 which are disposed in magnetic proximity to each of the cards 10 as the cards move angularly on the periphery of the drum 16. The output signals from the transducing members such as the members 92, 94, 96 and 98 are introduced to amplifiers such as amplifiers 170, 171, 172 and 173, respectively.

The output signals from the amplifiers such as the amplifiers 170, 171, 172 and 173 are introduced to corresponding input terminals of flip-flops such as flip-flops 174, 175, 176 and 177. The flip-flops may be constructed in a manner similar to that described on pages 164 to 166, inclusive, of volume 19 entitled "Wave Forms" of the Radiation Laboratory Series published in 1949 by the Massachusetts Institute of Technology. The flip-flops may be provided with two input terminals designated for convenience as the left and right input terminals. The output signals from the amplifiers 170, 171, 172 and 173 are shown as being respectively introduced to the left input terminals of the flip-flops 174, 175, 176 and 177. The flip-flops 174, 175, 176 and 177 and the other flip-flops included in the application may be constructed in a manner similar to that shown in FIGURES 5–6 and described in page 166 of volume 19 entitled "Wave Forms" of the Radiation Laboratory Series prepared by the Massachusetts Institute of Technology and published by the McGraw-Hill Book Company, Inc., of New York, N.Y. in 1949.

The output signals from the amplifier 170 are also introduced through a delay line 178 to the right input terminal of the flip-flop 174. The delay line 178 is adapted to provide a delay equal to substantially one half of the time required for adjacent vertical columns on the cards 10 to move past the heads such as the heads 92, 94, 96 and 98. The output signals from the amplifiers 171, 172 and 173 are also respectively introduced through inverters 179, 180 and 181 to the right input terminals of the flip-flops 175, 176 and 177. The inverters 175, 176 and 177 and the other inverters in the application may be constructed in a manner similar to that shown in FIGURE 1.3 and described on page 10 of volume 19 entitled "Wave Forms" of the Radiation Laboratory Series prepared by the Massachusetts Institute of Technology and published by the McGraw-Hill Book Company, New York, N.Y. in 1949.

The flip-flops such as the flip-flops 175, 176 and 177 also have two output terminals designated for convenience as the left and right output terminals. In FIGURE 5, the left and right output terminals of the flip-flops 175, 176 and 177 are shown as being connected to a translator indicated in block form at 182. The translator 182 may be constructed in a manner similar to one shown in Hartley Patent 2,446,042. In this patent certain switches operated by a set of storage elements or relays are respectively controlled in accordance with the values of binary digits of first and second least digital significance. Other switches of these relays are controlled in accordance with the value of the binary digit of third least significance. Still other switches of these relays in the Hartley patent are controlled in accordance with the value of the binary digit of fourth least digital significance.

The flip-flop 175 in FIGURE 5 of applicants' drawings, may control the operation of one of the first-named switches in Hartley in a manner similar to the control provided by the flip-flop 249 over the operation of the switch 254 in FIGURE 5 of applicants' drawings. In like manner, the flip-flop 176 in FIGURE 5 of applicants' drawings may control the operation of another of the first-named switches in the Hartley patent in a manner similar to the control provided by the flip-flop 249 over the operation of the switch 254 in FIGURE 5 of applicants' drawings. Similarly, the flip-flop 177 in FIGURE 5 of applicants' drawings may control the operation of the second-named switches in FIGURE 1 of the Hartley patent in a manner similar to the control provided by the flip-flop 249 over the operation of the switch 254 in FIGURE 5 of applicants' drawings.

For purposes of illustration, the translator 182 is described in the specification as providing a decoding of binary numbers to corresponding decimal values. Such a translation may be obtained by a bi-quinary decoding network or any other suitable decoding network or matrix system. Such networks are well known in the art. It should be appreciated, however, that any translator for decoding numbers of one matrix into numbers of another matrix or for changing any information from one form to another may also be used.

The translator 182 has a plurality of output terminals. For example, when a binary pattern of signal indications is translated into a decimal pattern, the translator 182 may have 10 output terminals each representing a different number between "0" and "9." The signals from each output terminal of the translator 182 are introduced to a different "and" network such as "and" networks 183, 184 and 185 in FIGURE 5. The "and" networks 183, 184 and 185 may be constructed in a manner similar to that disclosed and shown on page 32 of "Arithmetic Operations in Digital Computers" by R. K. Richards (published by D. Van Nostrand Company, Inc. of Princeton, N.J., in 1955). Each of the "and" networks such as the "and" networks 183, 184 and 185 also has a second input terminal connected to the output terminal of a compare network 186, one form of which will be described in some detail subsequently.

Connections are made to the input terminal of the selector 187 from an output terminal of the counter 188 and to the input terminal of the compare network 186 from the output terminal of the selector 187. One embodiment of a compare network 186, a selector 187 and a binary counter 188 are shown in FIGURE 6. The selector 187 may be formed from a plurality of single-pole, double-throw switches such as switches 189, 190, 191 and 192 in FIGURE 6. The switches such as the switches 189, 190, 191 and 192 may be pre-set into a particular pattern of operation by setting the movable contacts of the switches. For example, the movable contact of the switch 189 may be set into engagement with the lower stationary contact of the switch in a manner similar to that shown in FIGURE 6. Similarly, the movable contacts of the switches 190, 191 and 192 are set into engagement with the upper stationary contacts of the switches, as shown in FIGURE 6. The movable contacts of the switches may be set in a particular pattern corresponding to the particular vertical column to be selected on each card 10 for reading.

The counter 188 may be formed from a plurality of flip-flops such as flip-flops 193, 194, 195 and 196 in FIGURE 6. The flip-flops such as the flip-flops 193, 194, 195 and 196 may be connected in a conventional manner in a cascade arrangement. In such an arrangement, each flip-flop is adapted to be triggered by a signal from the preceding flip-flop when the preceding flip-flops are operating in a particular pattern. The first flip-flop 193 in the cascade arrangement is adapted to be triggered by each signal from the flip-flop 174 as shown in FIGURE 5. The counter 188 may be constructed in a manner similar to that shown in FIGURE 7–3 and described on page 195 of "Arithmetic Operations in Digital Computers" by R. K. Richards (published by D. Van Nostrand Company, Inc. of Princeton, N.J., in 1955).

The flip-flops 193, 194, 195 and 196 are respectively associated with the switches 189, 190, 191 and 192. For example, the left output terminal of each flip-flop is connected to the upper stationary contact of its associated switch in FIGURE 6. Similarly, a connection is made from the right output terminal of each flip-flop to the lower stationary contact of the associated switch. The voltages on the movable contacts of the switches 189, 190, 191 and 192 are applied to input terminals of an "and" network 197 corresponding to the compare network 186 in FIGURE 5.

It should be appreciated that other types of selectors than those formed by switches are represented at 187 in FIGURE 5. Furthermore, the selector may be disposed to provide other indications than a particular count. For example, the selector 187 may be disposed to pass signals representing only a particular type of information and to reject signals representing all other types of information. When such a selector is used, the counter 188 may be replaced by circuitry for passing from the card 10 signals representing the particular type of information.

The output signals from the "and" networks such as the "and" networks 183, 184 and 185 in FIGURE 5 are introduced to the left input terminals of flip-flops such as flip-flops 200, 202 and 204. The left output terminals of the flip-flops such as the flip-flops 200, 202 and 204 are connected to input terminals of "and" networks such as networks 208, 210 and 212. Connections are made to other input terminals of the "and" networks 208, 210 and 212 through a line 214 from the counter 188.

As will be described in detail subsequently, a signal passes through the line 214 to the "and" networks such as the "and" networks 208, 210 and 212 upon each completion of a full count in the counter 188 so as to pass through the "and" networks when the "and" networks have been prepared for opening. The output signals from the "and" networks such as the "and" networks 208, 210 and 212 are in turn respectively applied to the right input terminals of the flip-flops such as the flip-flops 200, 202 and 204.

The signals from the "and" network 208 are introduced to the left input terminal of a flip-flop 215 as well as to the right input terminal of the flip-flop 200. The left output terminal of the flip-flop 215 is connected to an input terminal of an "and" network 216 having another input terminal connected through the line 214 to the counter 188. The output signals from the "and" network 216 pass to the right input terminal of the flip-flop 215 and to the left input terminal of a flip-flop 218. A connection is made from the left output terminal of the flip-flop 218 to an input terminal of an "and" network 219 having another input terminal connected through the line 214 to the binary counter 188. The output signals from the "and" network 219 are introduced to the right input terminal of the flip-flop 218.

The left output terminal of the flip-flop 218 is not only connected to an input terminal of the "and" network 219 but also to one terminal of a solenoid 220 having its other terminal grounded. The solenoid 220 is magnetically coupled to the movable contact of a switch 221 to actuate the switch when energized. The switch 221 is spring-loaded to remain open except when actuated by a sufficient flow of current through the solenoid 220. The solenoid 220 and the switch 221 are shown only by way of illustration. For example, the solenoid 220 and the switch 221 may be replaced by a tube biased to cut-off and adapted to become conductive upon receiving a high voltage from the left output terminal of the flip-flop 218.

The switch 221 is in a circuit with a coil 222 and a suitable power supply such as a battery 223. The coil 222 corresponds to the coil of one of the magnetic gates such as the coil 144 of the pivotable gate 110 shown in FIGURES 3 and 4 and described fully above. Actually, the coil 222 forms a part of the pivotable gate 108 shown in FIGURE 1.

The output signals from the "and" network 210 in FIGURE 5 are introduced to the left input terminal of a flip-flop 224 as well as to the right input terminal of the flip-flop 202. A connection is made from the left output terminal of the flip-flop 224 to the left input terminal of an "and" network 225 having another input terminal connected through the line 214 to the counter 188. The output terminal of the "and" network 225 has a common connection with the right input terminal of the flip-flop 224 and with the left input terminal of a flip-flop 226.

The signals on the left output terminal of the flip-flop 226 are applied to an input terminal of an "and" network 227, another input terminal of which is connected through the line 214 to the counter 188. The output signals from the "and" network 227 pass to the right input terminal of the flip-flop 226 and to the left input terminal of a flip-flop 228. The left output terminal of the flip-flop 228 is connected to an input terminal of an "and" network 230 having another input terminal connected to the line 214 and having its output terminal connected to the right input terminal of the flip-flop 228.

The left output terminal of the flip-flop 228 is also connected to one terminal of a solenoid 232, the other terminal of which is grounded. The solenoid 232 corresponds to the solenoid 220 and controls the positioning of a spring-loaded switch 234 corresponding to the switch 221. It should be appreciated, however, that the solenoid 232 and the switch 234 may be replaced by other means such as a vacuum tube biased to cut-off in a manner similar to that described above.

The switch 234 is in a circuit with the coil 144 also shown in FIGURES 3 and 4 and forming a part of the pivotable gate 110 shown in FIGURES 1, 3 and 4. A suitable source of power such as a battery 238 is included in the circuit with the switch 234 and the coil 144. It should be appreciated, however, that the battery 238 may be replaced by the battery 223 by connecting the switch 234 and the coil 144 in parallel with the switch 221 and the coil 222.

The output signals from the "and" network 212 pass to the right input terminal of the flip-flop 204 and to the left input terminal of a flip-flop 240. The flip-flop 240 has its left output terminal connected to an input terminal of an "and" network 242, another input terminal of which is connected through the line 214 to the counter 188. The output signals from the "and" network 242 are in turn introduced to the right input terminal of the flip-flop 240 and to the left input terminal of a flip-flop 244.

Connections are made to input terminals of an "and" network 246 from the left output terminal of the flip-flop 244 and through the line 214 from the counter 188. The output terminal of the "and" network 246 is in turn connected to the right input terminal of the flip-flop 244 and to the left input terminal of a flip-flop 247. The left output terminal of the flip-flop 247 has a common connection with an input terminal of an "and" network 248. Another input terminal of the "and" network 248 is connected through the line 214 to the counter 188.

The output terminal of the "and" network 248 is connected to the right input terminal of the flip-flop 247 and to the left input terminal of a flip-flop 249. The signals on the left output terminal of the flip-flop 249 are introduced to an input terminal of an "and" network 250 having another input terminal connected through the line 214 to the counter 188. The output signals from the "and" network 250 pass to the right input terminal of the flip-flop 249.

The signals on the left output terminal of the flip-flop 249 are applied to the ungrounded terminal of a solenoid 252 as well as to the "and" network. The solenoid 252 corresponds in construction and operation to the solenoids 220 and 232 and controls the actuation of a spring-loaded switch 254 corresponding in construction and operation to the switches 221 and 234. It should be appreciated, however, that the solenoid 252 and the switch 254 may be replaced by other means such as a vacuum tube in a manner similar to that described above. The switch 254 is in a circuit with a coil 256 forming a part of the pivotable gate 154. A suitable source of power such as a battery 258 is also in the circuit. The battery 258 may actually be replaced by the battery 223 by connecting the switch 254 and the coil 256 in parallel with the switch 221 and the coil 222.

Figure 2:
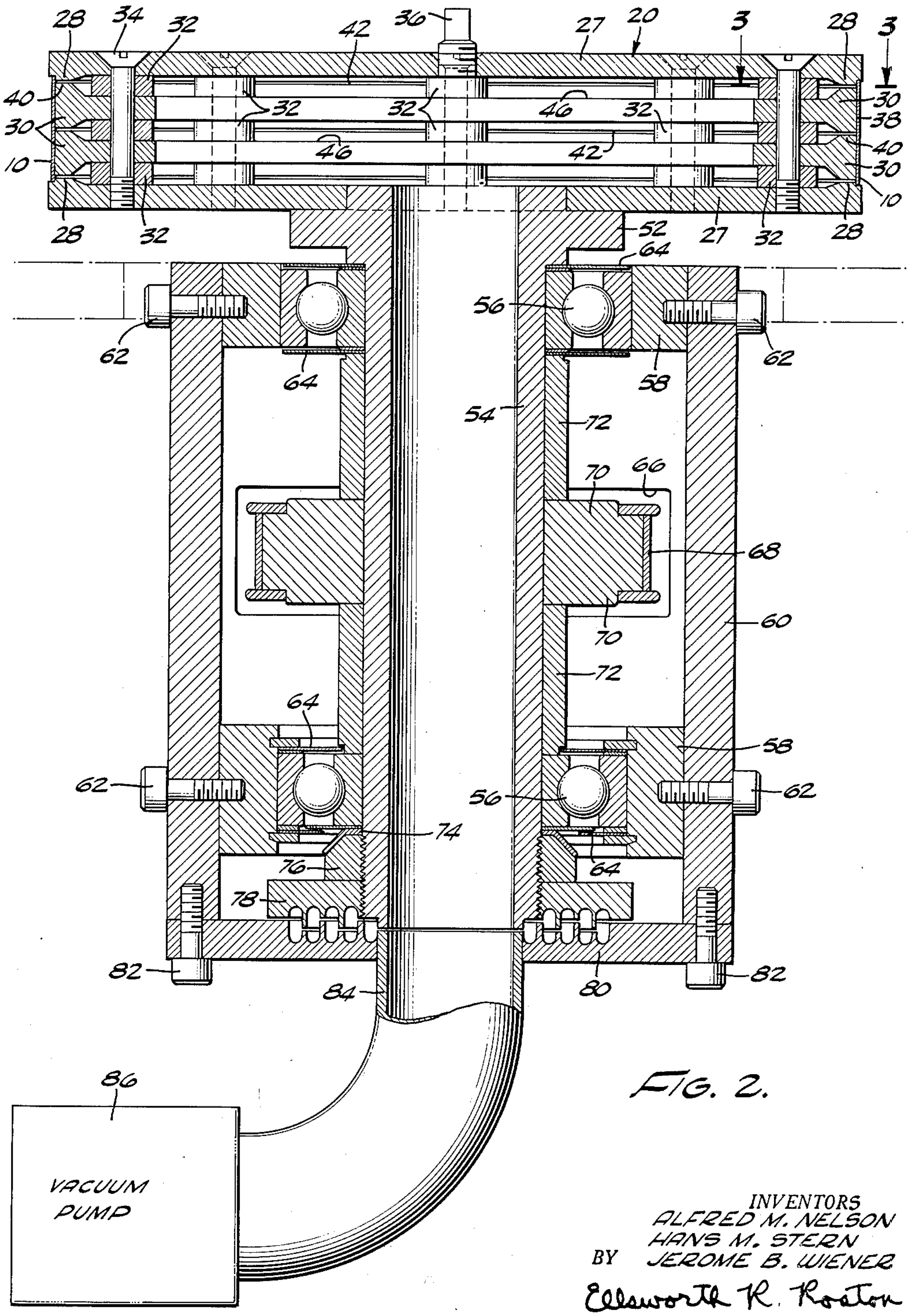
FIGURE 2 is an enlarged sectional view substantially on the line 2—2 of FIGURE 1 and illustrates in further detail the construction of one of the drums forming a part of the embodiment shown in FIGURE 1.

Since the drums 16, 18, 20, 22, 24 and 26 are constructed in a similar manner as described above, they also operate in a similar manner. For this reason, the operation of each drum should be understood from a description of the operation of the drum 20. Since the drum 20 is coupled to the shaft 54, it rotates with the shaft when the shaft is driven by the belt 68 (FIGURE 2). The housing 60 remains stationary as the shaft 54 rotates because of the operation of the bearings 56, and the conduit 84 also remains stationary since it is push fit into the plate defining the bottom of the housing.

Even though the shaft 54 is rotating relative to the conduit 84, the vacuum pump 86 is able to withdraw air through the continuous passageway formed by the shaft and the conduit. This results from the operation of the disk 78 and the plate 80 in producing a seal at the juncture between the shaft 54 and the conduit 84. The vacuum created by the pump 86 causes air to be withdrawn from the drum 20 through the passageways 46 and the hollow interiors of the shaft 54 and the conduit 84. Since the slots 42 communicate with the passageways 46, an inward pressure is created at the periphery of the drum 12 upon the operation of the vacuum pump 86.

As previously described, the drums 16, 20, 22, 24 and 26 are constructed and operate in a manner similar to that described above for the drum 18. In this way, a vacuum force is created on the periphery of each of the drums 16, 18, 20, 22, 24 and 26. This force is instrumental in maintaining the cards 10 in fixed position on the peripheries of the drums as the drums rotate. The cards 10 become positioned on the peripheries of the drums in a manner which will be described in detail subsequently.

When the drum 16 rotates in a counterclockwise direction as shown in FIGURE 1, it presses against the card 10 at the right end of the stack and moves the card with it towards the throat member 88. The drum 16 can be made to remove only one of the cards 10 from the stack at any time by adjusting the spacing between the throat member 88 and the periphery of the drum 16. Upon the removal of each card 10 from the stack 12, the card 10 becomes positioned on the periphery of the drum at the neck portion 38 (FIGURE 2). This helps to hold each card in position on the periphery of the drum as the drum rotates.

After each card 10 has been removed by the drum 16 from the stack, it rotates through a particular angular distance before reaching the gate 100 in FIGURE 1. Although the gate 100 is fixedly positioned, it has fingers similar to the fingers 130 in FIGURES 3 and 4. These fingers extend between the periphery of the drum 16 at their forward end and the periphery of the drum 18 at their rear end in a manner similar to that shown in FIGURE 3 for the finger 130. Because of this disposition, the fingers obtain a transfer of the cards from the periphery of the drum 16 to the periphery of the drum 18. This will be described in detail subsequently in connection with the operation of the gate 110 shown in FIGURES 3 and 4.

After the cards 10 have been transferred to the drum 18, they remain fixedly positioned on the periphery of the drum as the drum rotates in a clockwise direction. The cards remain in fixed position on the drum until they reach the gate 108. When the gate 108 is in a position similar to that shown in FIGURES 3 and 4 for the gate 110, the cards are transferred from the periphery of the drum 18 to the periphery of the drum 20. The cards thereafter remain on the periphery of the drum 20 until the drum carries them in a counterclockwise direction to the gate 110.

In the positioning of the gate 110 shown in FIGURES 3 and 4, the fingers 130 extend at their front end into the slots 42 in the drum 20. The fingers extend into the slots 42 into a position radially interior to the cards 10 traveling on the periphery of the drum 20. By disposing the fingers radially interior to the periphery of the drum 20 in a manner similar to that shown in FIGURE 3, the fingers block the movement of the cards 10 on the periphery of the drum so that the cards are forced to move along the fingers.

Because of the disposition of the fingers 130 relative to the drums 20 and 22, the cards 10 leave the drum 20 at the forward end of the fingers and travel along the fingers to the periphery of the drum 22. This results from the tapered configuration of the fingers 130 and from the disposition of the fingers in contiguous relationship to the drum 22 at a position laterally near the sleeve 124. When the cards reach the drum 22, the vacuum force produced at the periphery of the drum serves to hold the cards in fixed position on the periphery of the drum as the drum rotates.

The cards 10 cannot be lost during the process of transfer between a pair of adjacent drums such as the drums 20 and 22, since at least a portion of each card is forced by pressure against the periphery of a drum during the process of transfer. For example, the trailing portion of each card 10 is pressed against the drum 20 at the beginning of the card movement along the fingers 130 of the gate 110. Subsequently, the end portions of each card are disposed on the drums 20 and 22 while the middle portion is moving along the tapered edges of the fingers 130. In the final stages of transfer from the drum 20 to the drum 22, the leading portion of such card 10 is pressed against the periphery of the drum 22 by the vacuum force exerted on the drum.

In like manner, the cards transferred to the drum 22 by the gate 110 move with the drum as the drum rotates in a clockwise direction. This causes the cards 10 to move into position for transfer by the gate 154 to the drum 24. This transfer is obtained by the gate 154 when the gate is in a position similar to that shown in FIGURES 3 and 4 for the gate 110. The cards then remain fixedly positioned on the drum 24 and move in a counterclockwise direction in accordance with the drum rotation. After approximately one half of a revolution, the cards reach the gate 160 and become transferred to the drum 26 when the gate is in a position corresponding to that shown in FIGURES 3 and 4 for the gate 110. In like manner, the cards 10 become transferred from each drum to the next when the pivotable gate associated with the drums is in a position corresponding to that shown in FIGURES 3 and 4 for the gate 110.

At particular times, each of the gates such as the gates 108, 110, 154 and 160 is pivoted from a position similar to that shown in FIGURES 3 and 4 to its alternative position. The gate is pivoted upon the flow of current through the coil associated with the gate such as the coil 144 forming a part of the gate 110. Since the pivotable gates are constructed in a similar manner, their operation will be understood from a description of the operation of the gate 110. In the gate 110, the flow of current through the coil 144 causes flux to be produced in the magnet 142. This flux travels through a path which includes the armature 140. The flux acts upon the armature 140 to move the armature towards the magnet 142. This causes the rod 120 to pivot in a counterclockwise direction in FIGURE 3 against the action of the spring 122.

The pivotal movement of the rod 120 in a counterclockwise direction in FIGURE 3 causes the fingers 130 to move out of the slots 42 in the drum 20. Since the fingers 130 are no longer positioned within the slots 42, the cards 10 on the drum are able to rotate with the drum past the fingers. In this way, the cards remain fixedly positioned on the periphery of the drum 20 until they have traveled in a counterclockwise direction to the stack 150 (FIGURE 1). The stack 150 and the throat members 152 then operate in conjunction to peel the cards from the periphery of the drum. As the cards become peeled from the periphery of the drum, they are stored in the stack 150 in the sequence of their removal from the drum.

In like manner, each of the gates 108, 110, 154 and 160 is pivotable into a second position. In this position, the gate is uncoupled from the second of the two drums with which the gate is associated. For example, the gate 108 is pivotable into a second position to uncouple it from the drum 20. In this way, the cards on the drum 18 move past the gate 108 and become deposited in the stack 104 by the action of the stack and the throat member 106. Similarly, the cards on the drum 22 pass the gate 154 in the second position of the gate and become deposited in the stack 156. The cards on the drum 24 also move past the gate 160 when the gate is pivoted into its second position. The cards then become removed from the periphery of the drum 24 for storage in the stack 162.

The gates such as the gates 108, 110, 154 and 160 in FIGURE 1 are pivoted in accordance with the operation of the circuitry shown in FIGURES 5 and 6. The circuitry shown in FIGURES 5 and 6 in turn operates in accordance with the information on the various cards. This information may be in binary form in which an indication having first characteristics represents a binary value of "0" and an indication having second characteristics represents a binary value of "1." For example, when the information is in magnetic form, a magnetic bit of positive polarity may represent an indication of "1" and a magnetic bit of negative polarity may represent an indication of "0." Indications of "1" and "0" are illustrated schematically in the fragment of the card 10 shown in FIGURE 5.

The bits of binary information on the card 10 are disposed in a plurality of horizontal rows. One of the horizontal rows such as the bottom row of the card 10 in FIGURE 5 may have an indication of "1" in each position. By providing an indication of "1" in each position, a count is obtained as to the number of vertical columns which have been read. In this way, each vertical column on a card 10 is made available for selection from the other vertical columns on the card.

The transducing member 92 reads the indications of "1" in the successive positions on the bottom horizontal row of the card 10. These indications are amplified and inverted by the amplifier 170 and are introduced as negative signals to the left input terminal of the flip-flop 174. Each signal from the amplifier 170 triggers the flip-flop 174 to produce a relatively high voltage on the left output terminal of the flip-flop. At an intermediate time until the introduction of the next pulse position in the bottom horizontal row of the card 10, the negative signal from the amplifier 170 passes through the delay line 178. This signal then passes to the right input terminal of the flip-flop 174 and triggers the flip-flop to produce a relatively high voltage on the right output terminal of the flip-flop. In this way, the flip-flop 174 is prepared for triggering by the passage of a signal from the amplifier 170 to the left input terminal of the flip-flop.

Every time that the voltage on the left output terminal of the flip-flop 174 changes from a high level to a low level, the count in the counter 188 is increased by an integer. This results from the construction of the counter 188 such as from a plurality of flip-flops connected in cascade relationship. For each number, the flip-flops in the counter 188 are in an individual state of operation which is different from the pattern of flip-flop operation for any other number. For a particular count, the pattern of operation of the flip-flops in the counter 188 corresponds to the pattern of operation of the selector 187.

The operation of the counter 188 and the selector 187 may be seen from the embodiments shown in FIGURE 6. When each of the flip-flops 193, 194, 195 and 196 is triggered to a "true" state of operation, a relatively high voltage is produced on the left output terminal of the flip-flop and a relatively low voltage is produced on the right output terminal of the flip-flop. In its "false" state of operation, the flip-flop has a relatively high voltage on its right output terminal and a relatively low voltage on its left output terminal.

As will be seen, the movable contacts of the switches 189, 190, 191 and 192 in FIGURE 6 have relatively high voltages only when the flip-flops 193, 194, 195 and 196 have particular states of operation. For example, a relatively high voltage appears on the movable contact of the switch 189 only when the flip-flop 193 is in its false state of operation. Similarly, relatively high voltages are produced on the movable contacts of the switches 190, 191 and 192 only when the flip-flops 194, 195 and 196 are in their "true" state of operation.

Since the movable contacts of the switches 189, 190, 191 and 192 are connected to the "and" network 197, relatively high voltages can be simultaneously introduced to the switches only for a particular count in the flip-flops 193, 194, 195 and 196. This count is determined by the settings of the switches 189, 190, 191 and 192. When relatively high voltages are simultaneously introduced to the "and" network 197 from all of the switches such as the switches 189, 190, 191 and 192, the "and" network passes a signal. At all other times, the "and" network operates to prevent the passage of a signal.

For the particular setting of the switches 189, 190, 191 and 192 in FIGURE 6, the "and" network 197 passes a signal only upon the occurrence of a binary count of 1110, where the least signicant digit is at the right. This binary count corresponds to a decimal count of "14." The signal from the "and" network 197 in FIGURE 6 would correspond to a signal from the compare network 186 in FIGURE 5.

The heads such as the heads 94, 96 and 98 in FIGURE 5 produce signals in accordance with the magnetic information recorded on the cards 10. For example, the heads 94, 96 and 98 would produce a pattern of "101" in a first position on the card 10 shown in FIGURE 5 in accordance with the magnetic pattern provided on the card. In the next position, the heads 94, 96 and 98 would produce a pattern of "010" and in the third position would produce a pattern of "011," where the least significant digit is at the right.

The signals from the heads such as the heads 94, 96 and 98 are introduced to the amplifiers such as the amplifiers 171, 172 and 173. The signals are not only amplified but are also inverted in polarity by the amplifiers and are then introduced to the left input terminals of the flip-flops 175, 176 and 177. By inverting the signals, positive signals from the heads are introduced as negative signals to the left input terminals of the flip-flops. These signals trigger the flip-flops into their "true" state of operation as represented by relatively high voltages on the left output terminals of the flip-flops.

The signals of low amplitude from the heads 94, 96 and 98 are amplified and inverted by the amplifiers 171, 172 and 173 into signals of high amplitude. The signals are then inverted by the inverters 179, 180 and 181 into signals of low amplitude and are introduced to the flip-flops 175, 176 and 177. These signals trigger the flip-flops 175, 176 and 177 into their "false" states of operation as represented by relatively high voltages on the right output terminals of the flip-flops.

As will be seen, signals are produced in the flip-flops such as the flip-flops 175, 176 and 177 in accordance with the pattern of signals induced in the heads such as the heads 94, 96 and 98. The signals on the left and right output terminals of the flip-flops 175, 176 and 177 are introduced to the translator 182. The translator 182 operates to introduce a signal to a different one of the "and" networks such as the networks 183, 184 and 185 in accordance with the pattern of signals introduced to it from the flip-flops.

In accordance with the above discussion, the translator 182 would introuce a high voltage to the "and" network 183 when the signals simultnaeously produced in the flip-flops such as the flip-flops 175, 176 and 177 correspond to a decimal value of "1." Similarly, the "and" network 184 would receive a high voltage from the translator 182 upon the simultaneous production in the flip-flops such as the flip-flops 175, 176 and 177 of signals in a pattern corresponding to a decimal value of "2." A signal is introduced to the "and" network 185 from the translator 182 in accordance with a pattern of signals representing a decimal value of "3" in the flip-flops such as the flip-flops 175, 176 and 177.

It should be appreciated that the connections to the translator 182 are shown in FIGURE 5 only by way of illustration and that other connections may be made to the translator 182 to indicate decimal values other than those representing the integers "1," "2" and "3." The translator 182 may also be adapted to provide a change to other values than decimal values. When the translator 182 provides such a decoding action, each of the "and" networks such as the "and" networks 183, 184 and 185 would receive a high voltage to provide an individual indication.

The signals introduced to the "and" network 183 pass through the "and" network upon the simultaneous introduction of a signal of high amplitude from the compare network 186. As previously described, the "and" network 186 passes a signal when the count in the counter 188 corresponds to the pre-set count in the selector 187. The signals passing through the "and" network 183 are introduced to the left input terminal of the flip-flop 200.

The signals from the "and" network 183 trigger the flip-flop 200 so as to produce a relatively high voltage on the left output terminal of the flip-flop. This high voltage is introduced to the "and" network 208 to prepare the "and" network for activation. When the "and" network 208 becomes prepared for activation, it passes the next signal of high amplitude passing from the counter 188 through the line 214. This occurs upon the movement past the heads such as the heads 92, 94, 96 and 98 of the last position on the card 10. At such a time, the front end of the card is approaching the gate 100 in FIGURE 1 for transfer from the drum 16 to the drum 18.

It should be appreciated that the counter 188 may produce a signal on the line 214 every time that the count reaches a value of $2^n$ where $n$ is an integer and represents the number of flip-flops in the counter such as the flip-flops 193, 194, 195 and 196 in FIGURE 6. The counter 188 may also produce a signal on the line 214 when it reaches a particular count different from the maximum count available in the counter. A signal may be produced at this particular count to trigger the flip-flops in the counter for the initiation of a new count.

The signal passing through the "and" network 208 in FIGURE 5 is introduced to the right input terminal of the flip-flop 200. The signal triggers the flip-flop 200 for the production of a relatively high voltage on the right output terminal of the flip-flop. In this way, the flip-flop 200 is converted to its false state so as to become prepared for triggering by the next signal from the "and" network 183. The signal from the "and" network 208 also triggers the flip-flop 215 to produce a relatively high voltage on the left output terminal of the flip-flop. This causes the "and" network 216 to become prepared for activation. The "and" network 216 becomes prepared for activation at the time that the first card (hereinafter designated as the "selective" card) is moving along the drum 18.

As the card following the selective card 10 moves with the drum 16 on the periphery of the drum, the last information position on the card moves past the heads such as the heads 92, 94, 96 and 98. This causes a signal to be introduced to the line 214 from the counter 188. Since the "and" network 216 has been prepared for opening, the signal on the line 214 passes through the "and" network. The signal triggers the flip-flop 215 to its false state as represented by a relatively high voltage on the right output terminal of the flip-flop. In this way, the flip-flop 215 is prepared for subsequent triggering by a signal passing through the "and" network 208.

The signal from the "and" network 216 also triggers the flip-flop 218 to its true state as represented by a relatively high voltage on the left output terminal of the flip-flop. This high voltage is introduced to the solenoid 220 to produce a relatively large flow of current through the solenoid. The solenoid 220 receives a large flow of current at the time that the selective card 10 is approaching the pivotable gate 108. Because of the large flow of current through the solenoid 220, sufficient magnetic flux is produced in the solenoid to actuate the movable contact of the switch 221 into engagement with the stationary contact of the switch.

Upon the closure of the switch 221, a continuous circuit is produced which includes the battery 223, the coil 222 and the switch. The coil 222 forms a part of the gate 108 shown in FIGURE 1 and corresponds in function to the coil 144, which is shown in FIGURE 3 and which is included in the gate 110. The flow of current through the coil 222 causes the gate 108 in FIGURE 1 to be pivoted from its coupling relationship with the drum 18. In this way, the cards positioned on the periphery of the drum 18 are able to move with the drum past the gate 108 so as to be deposited in the stack 104. Because of the operation described above, the stack 104 receives the cards coded to indicate in binary form a decimal value of "1" at a particular position on the card. This is proper since the stack 104 is the first stack in the plurality.

The relatively high voltage on the left output terminal of the flip-flop 218 is not only introduced to the solenoid 216 but also to the "and" network 219. This voltage prepares the "and" network 219 for activation. As the last position of the second card after the selective card moves past the heads such as the heads 92, 94, 96 and 98, a signal of high amplitude is produced on the line 214 by the counter 188. This signal passes through the "and" network 219 because of the preparation of the "and" network for activation.

The signal from the "and" network 219 triggers the flip-flop 218 to its false state. This is represented by a relatively high voltage on the right output terminal of the flip-flop 218 and a relatively low voltage on the left output terminal of the flip-flop. Since this low voltage is introduced to the solenoid 220, relatively little current flows through the solenoid. The current is insufficient to hold the movable contact of the switch 221 in engagement with the stationary contact against the action of the spring in the switch. The opening of the switch 221 produces an interruption of the current through the coil 222, thereby causing the gate 108 to pivot into coupling relationship between the drums 18 and 20. This occurs after the movement of the selective card 10 to the stack 104 in FIGURE 1 and prevents any further cards from moving to the stack.

In like manner, a signal passes from the translator 182 to the "and" network 184 when signals are simultaneously induced in the heads such as the heads 94, 96 and 98 to represent a decimal value of "2." The signal passes through the "and" network 184 only when it is introduced to the "and" network at the time that the counter 188 has registered a count corresponding to the count pre-set in the selector 187.

The signal passing through the "and" network 184 triggers the flip-flop 202 for the production of a relatively high voltage on the left output terminal of the flip-flop. This voltage is introduced to the "and" network 210 to prepare the network for the passage of a signal. Since the "and" network 210 is connected through the line 214 to the counter 188, the "and" network passes a signal of high amplitude on the line 214 when it becomes prepared for activation. This occurs at the last information position on the selective card 10 moving past the heads such as the heads 92, 94, 96 and 98.

When the "and" network 210 passes a signal, it triggers the flip-flop 202 to its false state as represented by a relatively high voltage on the right output terminal of the flip-flop. At the same time, the signal from the "and"

network 210 triggers the flip-flop 224 to produce a relatively high voltage on the left output terminal of the flip-flop. The flip-flop 224 becomes triggered at the time that the selective card 10 has moved to the gate 100 in FIGURE 1 for transfer from the drum 16 to the drum 18.

The relatively high voltage on the left output terminal of the flip-flop 224 (FIGURE 5) continues until the last position on the card following the selective card has moved past the read heads such as the heads 92, 94, 96 and 98. At such a time, the "and" network 225 passes a signal. The "and" network 225 passes a signal at this time because of the simultaneous introduction of signals from the flip-flop 224 and the line 214.

Upon the passage of a signal through the "and" network 225, the flip-flop 224 becomes triggered to its false state as represented by a relatively high voltage on the right output terminal of the flip-flop. At the same time, the flip-flop 226 becomes triggered to produce a relatively high voltage on its left output terminal. The flip-flop 226 becomes triggered at the time that the selective card 10 has reached the gate 108 in FIGURE 1. Since the gate 108 has not been actuated at this time, it produces a transfer of the selective card 10 from the drum 18 to the drum 20. The selective card 10 then moves with the drum 20 in a counterclockwise direction on the periphery of the drum as the drum rotates.

The flip-flop 226 remains in its true state of operation until the last pulse position on the next card 10 has moved past the heads such as the heads 92, 94, 96 and 98. This card is the second card after the selective card. As the last pulse position of this second card moves past the heads 92, 94, 96 and 98, the counter 188 registers a full count, thereby causing a signal of high amplitude to be produced on the output line 214. This signal passes through the "and" network 227 because the "and" network has been prepared for activation by the high voltage on the left output terminal of the flip-flop 226.

The signal passing through the "and" network 227 is introduced to the flip-flop 226 to trigger the flip-flop for the production of a relatively high voltage on the right output terminal of the flip-flop. The signal from the "and" network 226 also passes to the flip-flop 228 and triggers the flip-flop to produce a relatively high voltage on the left output terminal of the flip-flop. This voltage is introduced to the solenoid 232 to produce a relatively large flow of current through the solenoid. The resultant flux produced in the solenoid 232 is of a sufficient intensity to actuate the movable contact of the switch 234 into engagement with the stationary contact of the switch.

When the movable contact of the switch 234 engages the stationary contact of the switch, a continuous circuit is established which includes the battery 238, the coil 144 and the switch 234. This causes current to flow through the coil 144, which forms a part of the gate 110 shown in detail in FIGURES 3 and 4 and described fully above. The current flowing through the coil 144 produces an actuation of the gate 110 into its alternative position. In this position, the gate 110 becomes uncoupled from the drum 20 (FIGURE 1) so that the selective card 10 moves past the gate to the stack 150. In this way, the selective card 10 becomes deposited in the stack 150. The stack 150 is the proper one in which the selective card 10 should be deposited since the stack 150 is the second stack and the selective card 10 had a decimal value of "2" at the particular position on the card.

The gate 110 remains actuated for the time required for a card 10 to move on the drum 16 past the heads such as the heads 92, 94, 96 and 98. This is a time equivalent to that required for the selective card 10 to move past the gate 110. At the end of this time, a signal passes through the "and" network 230 and triggers the flip-flop 228 to its false state. This causes a relatively low voltage to be produced on the left output terminal of the flip-flop 228. This voltage causes the large current through the solenoid 232 to become interrupted such that the switch 234 opens.

When the switch 234 opens, the current through the coil 144 becomes interrupted. This in turn causes the gate 110 to return to its position coupling the drums 20 and 22 in FIGURE 1 so that the cards traveling on the drum 20 will become transferred to the drum 22. In this way, only the selective card 10 becomes deposited in the stack 150. Furthermore, since the flip-flops 202, 224, 226 and 228 have all been triggered to their false state, these flip-flops are prepared to initiate a new operation for the transfer of a successive card to the stack 150.

Signals of high amplitude pass to the "and" network 185 in FIGURE 5 from the translator 182 to indicate a decimal value of "3" in a selective card 10. When a signal is introduced to the "and" network 185 at the same time that on output signal is obtained from the compare network 186, the signal passes through the "and" network 185. This signal triggers the flip-flop 204 for the production of a relatively high voltage on the left output terminal of the flip-flop.

The high voltage on the left output terminal of the flip-flop 204 continues until the end of the selective card 10 has moved past the heads such as the heads 92, 94, 96 and 98. A signal then passes through the "and" network 212 and triggers the flip-flop 240 such that a high voltage is produced on the left output terminal of the flip-flop. The high voltage continues on the left output terminal of the flip-flop 240 while the selective card 10 advances around the drum 18 in FIGURE 1 to the gate 108.

During the time that the selective card 10 is moving on the drum 18 towards the gate 108, the card following the selective card is moving on the drum 16 past the heads such as the heads 92, 94, 96 and 98. When the end of the card following the selective card 10 reaches the heads, the selective card 10 reaches the gate 108 for transfer to the drum 20. At this time, a signal passes through the "and" network 242 in FIGURE 5 and triggers the flip-flop 244 to its true state as represented by a relatively high voltage on the left output terminal of the flip-flop.

The selective card 10 is moving along the drum 20 in FIGURE 1 towards the gate 110 during the time that a relatively high voltage is produced on the left output terminal of the flip-flop 244. During this time, the second card 10 after the selective card is moving on the drum 16 past the heads such as the heads 92, 94, 96 and 98. When the last position on this second card is moving past the heads, a signal passes through the "and" network 246 in FIGURE 5 and triggers the flip-flop 247 to its true state as represented by a relatively high voltage on the left output terminal of the flip-flop. At the time that the flip-flop 247 is triggered to its true state, the selective card 10 is being transferred by the gate 110 in FIGURE 1 from the drum 20 to the drum 22.

The relatively high voltage on the left output terminal of the flip-flop 247 continues while the next card 10 is moving on the drum 16 past the heads such as the heads 92, 94, 96 and 98. This next card is the third card following the selective card. As the last information position on this third card moves past the heads, a signal passes through the "and" network 248. This signal triggers the flip-flop 249 to produce a relatively high voltage on the left output terminal of the flip-flop. A relatively high voltage is produced on the left output terminal of the flip-flop 249 at the time that the selective card 10 is approaching the gate 154.

The high voltage on the left output terminal of the flip-flop 249 produces a large flow of current through the solenoid 252 in FIGURE 5. This large flow of current causes a sufficient force to be exerted upon the movable contact of the switch 254 for a closure of the switch.

Upon the closure of the switch 254, current flows through a circuit including the battery 258, the coil 256 and the switch. The current through the coil 256 produces a pivotal movement of the gate 154 in FIGURE 1 so that the gate becomes uncoupled from the drum 22. This causes the selective card 10 to travel on the drum 22 past the gate 154 for deposit in the stack 156. The stack 156 is the proper stack since it is the third stack, corresponding to the decimal value of "3" read on the selective card 10.

Only the selective card 10 becomes deposited in the stack 156. The reason is that a signal passes through the "and" network 250 (FIGURE 5) after the selective card 10 has moved on the drum 22 past the gate 154. This signal triggers the flip-flop 249 to its false state as represented by a relatively high voltage on the right output terminal of the flip-flop and a relatively low voltage on the left output terminal of the flip-flop. The low voltage on the left output terminal of the flip-flop 249 causes the switch 254 to open and the current through the coil 256 to be interrupted. Upon the interruption of the current through the coil 256, the gate 154 in FIGURE 1 pivots to its normal position for obtaining a transfer of the cards 10 from the drum 22 to the drum 24.

In like manner, selective cards are deposited in their appropriate stacks in accordance with information digitally recorded on the cards. Only the selective card is passed to the appropriate stack because of the operation of the pivotable gates and their associated electrical circuitry. Each of the other cards is passed by the pivotable gates to successive drums until it reaches the drum which is to carry it to the proper stack. The gate associated with this drum is then pivoted so that the drum can carry the card past the gate to the appropriate stack.

As has been previously described, a plurality of horizontal rows of information may be disposed on each card 10. These rows may be divided into groups. The first group may represent the most important digit in a multi-digital number and successive groups may represent successive digits in the multi-digital number. For example, the first four horizontal rows of the fragmentary card 10 in FIGURE 5 may indicate a first decimal digit in a particular vertical position. Other groups of four horizontal rows may indicate successive decimal digits in the same vertical position.

Because of the coded indication of such values as a multi-digital number, it may be necessary to pass the cards 10 a number of times through the apparatus shown in FIGURES 1 to 6, inclusive, and described fully above. For example, the cards initially collected in the stack 100 may represent the 100's digit of a multi-digital number. The number may actually be any value between "100" and "199," inclusive. This precise value may be obtained by other information on the card when the card is subsequently passed through the sorting apparatus. By such subsequent passages of the cards through the apparatus, a refined sorting is obtained.

When the cards 10 are passed more than once through the apparatus shown in FIGURE 1, certain problems may arise. This results from the fact that alternate stacks such as the stacks 104, 156 and 166 in FIGURE 1 collect the cards with one face pointing towards the drums and the other stacks such as the stacks 150 and 162 collect the cards with the opposite faces pointing towards the drums. This phenomenon occurs because one face contacts one drum and the opposite face contacts the next drum as the cards become transferred from one drum to the next.

Figure 7:
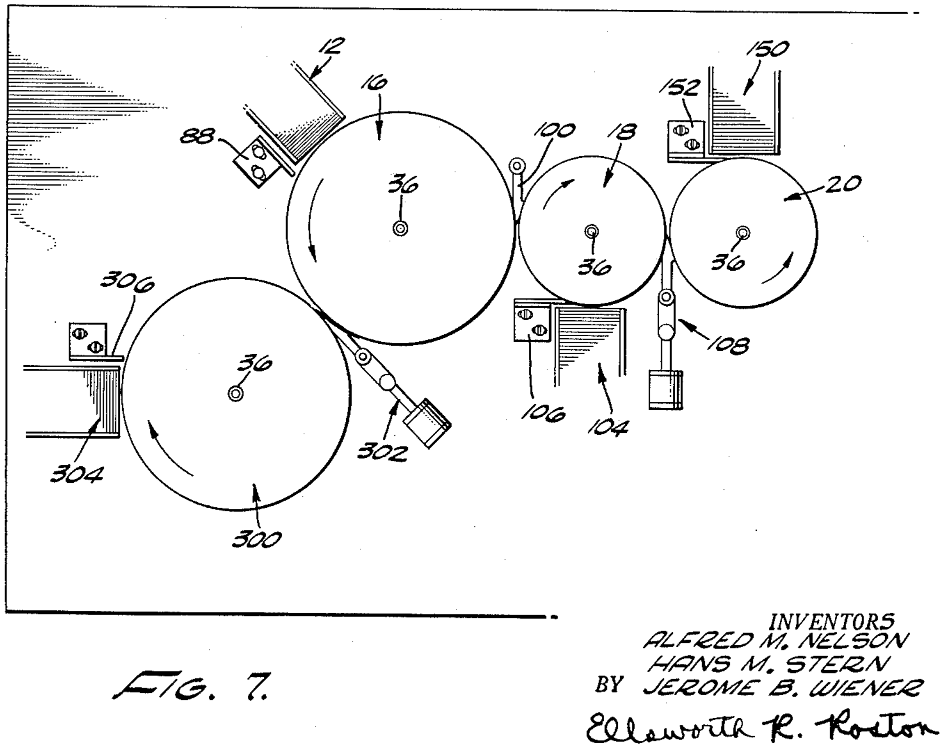
FIGURE 7 is a fragmentary top plan view similar to FIGURE 1 and illustrates certain additional components for use with the apparatus shown in FIGURE 1 to perform functions supplementary to those performed by the apparatus shown in FIGURE 1.

The apparatus shown in FIGURE 7 is included to alleviate this problem. The apparatus is similar to that shown in FIGURE 1 except that it includes an additional drum 300 and components associated with the drum. The drum 300 is constructed in a manner similar to the drum 16 shown in FIGURES 1 and 7 but is adapted to rotate in a direction opposite to the drum 16. The drum 300 is disposed in contiguous relationship to the drum 16.

A pivotable gate 302 is disposed between the drums 300 and 16 at the position in which the drums are contiguous. The gate 302 is constructed in a manner similar to the gate 110 shown in FIGURES 1, 3 and 4 and described fully above. The gate 302 is adapted to operate on cards carried by the drum 300 from a stack 304 corresponding to the stack 12 in FIGURES 1 and 7. An adjustable throat member 306 corresponding to the throat member 88 in FIGURES 1 and 7 is disposed in contiguous relationship to the stack 304 to control the removal of cards by the drum 300 from the stack.

The stack 12 and the drum 16 are used to circulate the cards 10 when the cards have the proper faces pointing towards the drum. The drum 16 and the throat member 88 operate in conjunction to remove the cards individually from the stack for movement along the successive drums 16, 18, etc. However, when the cards 10 have been inverted in a stack such as the stacks 150 and 162 in FIGURE 1, the cards are disposed in contiguous relationship to the drum 300 in a manner similar to the cards in the stack 304 in FIGURE 7. The drum 300 removes these cards and the gate 302 transfers the cards to the drum 16. By using the drum 300 to transfer the cards in the stack 304 to the drum 16, the cards in the stack 304 have the same faces in contact with the drum 16 as the cards in the stack 12.

The apparatus shown in FIGURE 7 and described above is especially advantageous for certain patterns of signal coding in the cards 10. In these patterns, cards having decimal indications of "1" would be collected in the stack 104 in FIGURE 1; cards having decimal indications of "2" would be deposited in the stack 156; cards having decimal indications of "3" would be deposited in the stack 166, etc. Similarly, cards having decimal indications of "6" and "7" would be respectively deposited in the stacks 150 and 162.

In this way, all of the cards with low decimal values would be deposited in the stacks with the same faces pointing toward the drums. These cards could then be collected from the different stacks such as the stacks 104, 156 and 166 and applied in order to the stack 12 in FIGURE 7. In like manner, the cards having high decimal values would be deposited in their proper stacks with their opposite faces pointing toward the drum. After the recirculation of the cards with the low decimal values, the cards with high decimal values would then be applied in order to the stack 304 in FIGURE 7 so as to invert the faces of the cards when the cards are transferred from the drum 300 to the drum 16.

It should be appreciated that the information controlling the activation of the different pivotable gates at any instant does not necessarily have to appear in a selected vertical column of each card. For example, a particular position may be selected on each card 10 by the selector 187. In the following positions on the card, the information controlling the activation of the different pivotable gates may be obtained from selective positions in the different horizontal rows.

It should be further appreciated that a number of blank cards may be used after the last card in the stack 12 to make certain that the cards reach the proper output station. These blank cards merely serve to produce a signal at the last position on the cards so that the intelligence decoded from the last information card on the stack can be advanced to successive flip-flops in a bank. For example, these flip-flops might correspond to the flip-flops 244, 247 and 249 in the last bank shown, in FIGURE 5. In this way, the proper pivotable gate would be activated to obtain a movement of the last information card to the output stack associated with the gate.

The apparatus disclosed above has certain important advantages. It uses a plurality of drums to circulate a number of cards and deposits the cards in a plurality of stacks in accordance with signal information on the cards. In this way, the cards can be sorted into a logical pattern dependent upon the information on the cards.

It should be appreciated that the term "transport means" is intended to include drums as well as other types of conveyors for the cards. It should also be appreciated that the term "cards" is intended to include any type of discrete elements capable of storing a plurality of bits of information.

The transducing members 92, 94, 96 and 98 and the circuitry associated with the transducing members and shown in FIGURE 5 may be considered as means for "sensing" particular bits of indications such as recited in the claims. The translator 182 and the circuitry associated with the translator in FIGURE 5 may be considered as one type of means for "processing" the particular bits of information sensed on the cards. It will be appreciated that the term "processing" as used in at least some of the claims is intended to cover other types of operations in addition to that represented by the circuitry shown in FIGURE 5 and described in the specification.

As used in the claims, the term "retaining means" is intended to cover the structure including the throat member 88 shown in FIGURE 1 for providing a controlled transfer of cards from the input stack such as the input stack 10 in FIGURE 1 to the transport means such as the drum 16 in FIGURE 1. The term "gating means" as used in the claims is intended to cover the structure shown in FIGURES 3 and 4 for providing a controlled transfer of cards between the different pairs of transport means such as drums.

The term "transfer means" as used in the claims is intended to indicate the structure such as the stop 158 in FIGURE 1 for providing a transfer of cards from the transport means such as the drum 22 to the associated output stacks such as the stack 156. The term "receiving means" as used in the claims is also intended to cover such structure as the stop 158 and the stack 156.

It will be appreciated that the terms "retaining means," "transfer means," "gating means" and "receiving means" as used in the claims are intended to cover structures providing functions equivalent to those provided by the structures shown in the drawings and described in the specification. For example, the "gating means" are recited in the claims as providing first and second "relationships" for controlling the transfer of cards between the associated pair of transport means. It will be appreciated that such controls may be obtained by gates other than those which operate on a pivotal basis.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for processing a plurality of cards each having a plurality of bits of information, an input stack for holding the cards, a plurality of rotatable drums each constructed to hold the cards in fixed position on the drum during the drum rotation and each disposed in paired relationship to at least one other drum in the plurality, means operatively coupled to the drums in the plurality for obtaining a rotation of the drums, means including at least a first drum in the plurality for removing the cards individually from the stack for movement with the first drum and for transfer to other drums in the plurality, means operatively coupled to the drums in the plurality for imposing a force on the cards on the drums to retain the cards in fixed position on the drums during the rotation of the drums, means including a plurality of output stacks each disposed relative to a different drum in the plurality to obtain the transfer of cards from that drum to the associated output stack, control means associated with different drums in the plurality to provide a controlled transfer of cards between such drums and the paired drums in the plurality and actuable to obtain the transfer of cards to the output stacks associated with such drums, and means including electrical circuitry operative upon the cards transferred from the input stack to the drums in the plurality and responsive to selective bits of information on such cards for obtaining an actuation of the control means for a transfer of the cards to the stacks associated with the different drums in a pattern dependent upon the selective bits of information on the cards.

2. In combination for processing a plurality of stacked cards each having a plurality of bits of information recorded thereon, a plurality of rotatable drums constructed to hold the cards in fixed position on the drums for movement with the drums and disposed in paired relationship for a transfer of cards from each drum in the pair to the other drum in the pair, means operatively coupled to the drums in the plurality for obtaining a movement of the cards with the drums, means operatively associated with the stacked cards for providing a controlled transfer of the cards in sequence to a first drum in the plurality, means operatively coupled to the drums in the plurality for obtaining a rotation of the drums, collecting means associated with particular drums in the plurality and constructed to obtain a transfer to the collecting means of the cards moving with the drums, means associated with each drum and operative in a first state for intercepting the cards moving with the drums before their movement to the associated collecting means and for transferring the cards to the paired drum in the plurality and operative in a second state to provide for a passage of the cards to the associated collecting means, and means operative upon the cards transferred to the drums and selectively responsive to the bits of information on such cards for obtaining an operation of the last mentioned means in the second state at particular times in accordance with the selectively responsive bits of information on the cards and upon the movement of the cards to the last mentioned means to provide for the movement of the cards on the drums to the associated collecting means.

3. In combination for processing a plurality of cards each having a plurality of bits of information, an input stack for holding the cards, a plurality of rotatable drums each constructed to produce a vacuum at its periphery to hold the cards for movement with the drum, means operatively coupled to the drums in the plurality to produce a vacuum at the peripheries of the drums, means operatively coupled to the drums in the plurality for obtaining a rotation of the drums, the drums in the plurality being disposed in paired and adjacent relationship to produce a transfer of cards from the periphery of each drum in the plurality to the periphery of the adjacent drum in the plurality at substantially a common tangential position, means disposed relative to the cards in the input stack for providing a controlled transfer of cards in sequence from the input stack to a first one of the drums in the plurality in the order of the disposition of the cards in the stack, means including a plurality of gates each disposed in contiguous relationship to a different pair of drums in the plurality at the transfer position to facilitate in one operative relationship the transfer of the cards from the periphery of a first drum in the pair to the periphery of the second drum in the pair for the exertion of a vacuum force on the cards by the second drum in the pair and to provide in a second operative relationship for the movement of the cards with the first drum in the pair past the gate, means disposed relative to the drums at a position past the gates in the direction of movement of the cards for separately operating upon the cards on the drums to collect the cards moving with the drums past the gates, and means operative upon the cards transferred to the drums from the input stack and responsive to selective bits of information on such cards for obtaining a controlled operation of each gate in the plurality at particular times in the first and second relationships in accordance with the selective bits of information on the cards and upon a movement of the cards to the gate.

4. In combination for processing a plurality of cards each having a plurality of bits of information, an input stack for holding the cards, a first drum disposed relative to the cards in the stack to obtain a controlled and sequential transfer of cards individually to the drum from the stack and constructed to obtain a movement of the cards with the drum after the transfer of the cards to the drum, a plurality of drums disposed relative to the first drum and one another to provide a paired relationship and constructed to obtain a movement of the cards with the drums after the transfer of cards to the drums, means including vacuum means operatively coupled to the first drum and the plurality of drums for holding the cards on the first drum and the plurality of drums during the movements of the cards with the drums, receiving means associated with each of the drums in the plurality for obtaining a transfer to the receiving means of the cards moving with the drums, transfer means disposed between particular pairs of the first drum and the drums in the plurality for obtaining a transfer of the cards from first drums in the pairs to the other drums in the pairs at particular times and for obtaining at other times a movement of the cards to the receiving means associated with the first drums in the particular pairs, and means disposed relative to the cards transferred from the input stack to the first drum and responsive to selective bits of information on such cards for controlling the particular times at which the transfer means are operative to produce a transfer of the cards from one drum in each pair to the other drum in that pair.

5. In combination for use with a plurality of cards each having a plurality of bits of information, a pair of rotatable drums disposed relative to each other to provide for a transfer of the cards from a first drum in the pair to the second drum in the pair, means operatively coupled to the drums in the pair for producing a rotation of the drums, a first stack disposed relative to the cards on the first drum for collecting such cards and for holding such cards in stacked relationship, means for applying vacuum forces to the drums in the pair to maintain the cards individually in fixed position on the drums, means including a stripping member associated with the first drum in the pair for obtaining a transfer of the cards from the first drum after a rotation of the cards with the drum through a particular angle and for obtaining a collection of such cards in the first stack, a gate disposed between the drums and operative in a first state to obtain a transfer of the cards individually from the first drum in the pair to the second drum in the pair upon the rotation of the cards through an angle less than the particular angle and operative in a second state to provide for the rotation of the cards with the first drum through the particular angle, and means operative upon the cards on the first drum and responsive to selective bits of information on such cards before the movement of the cards to the position of transfer of the cards by the gate for producing an operation of the gate in the first and second states upon a movement of the cards to the position of transfer of the cards by the gate between the drums and for obtaining such operation of the gate at particular times in accordance with such selective information.

6. In combination for use with a plurality of cards each having a plurality of bits of information, a pair of rotatable drums disposed in a relationship capable of providing a transfer of cards from a first drum in the pair to the second drum in the pair, means operatively coupled to the drums for obtaining a rotation of the drums, means for imposing a pressure on the drums for holding the cards individually in fixed position on the drums during the drum rotation, a gate extending between the drums for providing in a first operative state a coupling between the drums to obtain a transfer of the cards individually from the first drum in the pair to the second drum in the pair after the rotation of the cards through a particular angular distance with the first drum and for disengaging in a second operative state the coupling between the drums to produce a continued movement of the cards with the first drum past the position of transfer of the cards to the second drum, means including electrical circuitry responsive to selective bits of information on the cards moving with the first drum and responsive to such selective bits before the movement of the cards with the first drum to the position of transfer to the second drum for obtaining an operation of the gate in its first and second states in accordance with the selective bits of information on the cards and upon the movement of the cards with the first drum to the position of transfer by the gate to the second drum, and means disposed relative to the first drum at a position along the drum past the position of transfer to the second drum for obtaining a transfer from the first drum of the cards moving with the first drum past the position of transfer of the cards to the second drum and for collecting such cards.

7. In combination for use with a plurality of cards disposed in stacked relationship and having a plurality of bits of information on each card, first and second rotatable drums disposed relative to each other to facilitate a transfer of cards between the drums, means operatively coupled to the first and second drums for producing a rotation of the drums, means operatively coupled to the first and second drums for maintaining the cards in fixed position on the periphery of the drums during the drum rotation for an individual movement of the cards with the drums, a gate disposed between the drums and operative in a first state to provide an individual transfer of the cards from the first drum to the second drum and operative in a second state to provide for a movement of the cards with the first drum past the position of transfer of the cards by the gate to the second drum, and means responsive to selective bits of information on the cards moving with the first drum for operating on the gate at particular times to obtain an operation of the gate in the second state in accordance with the selective bits of information on the cards and upon the movement of such cards with the first drum to the gate.

8. In combination for use with a plurality of cards each having a plurality of bits of information, a pair of rotatable drums disposed relative to each other to facilitate the transfer of cards between a first drum in the pair and the second drum in the pair, means operatively coupled to the drums in the pair for producing a rotation of the drums, means operatively coupled to the drums for creating vacuums in the drums to impose pressures at the peripheries of the drums, the drums being constructed to provide for the transfer of the vacuum effect to the peripheries of the drum for the imposition of retaining pressures on the cards disposed on the peripheries of the drums to obtain an individual movement of the cards with the drums, a gate operative in a first state to provide a coupled relationship between the drums for an individual transfer of the cards from the first drum in the pair to the second drum at a particular position of the cards and operative in a second state to provide a decoupled relationship between the second drum and the first drum for the prevention of the card transfer, and means responsive to selective bits of information on the cards moving with the first drum to obtain a controlled operation of the gate in the first and second states at particular times in accordance with the selective bits of information on the transported cards and upon the movement of the cards with the first drum to the position of transfer by the gate to the second drum to provide a controlled transfer of cards from the first drum to the second drum.

9. In combination for use with a plurality of cards each having a plurality of bits of information, a pair of rotatable drums each having passageways for the withdrawal of fluid such as air, the drums being disposed relative to each other to facilitate a transfer of cards between the drums, means for producing vacuum effects, means for providing a conduit between the vacuum means and the passageways in the drums for withdrawing fluid from the passageways, there being slots in the peripheries of the drums in communication with the passageways to produce a pressure on the cards disposed on the drum peripheries for retaining the cards individually in fixed position on the drum peripheries during the rotation of the drums, means operatively coupled to the drums in the pair for producing a rotation of the drums, a gate disposed in pivotable relationship to the drums in the pair at their position of contiguity to obtain an individual transfer of the cards from one drum to the other in a first position of the gate and to prevent a transfer of the cards from one drum to the other in a second position of the gate, and means responsive to selective bits of information on cards moving with the first drum for operating on the gate at particular times to obtain a pivotal movement of the gate from the first position to the second position in accordance with the selective bits of information on the cards and upon a movement of the cards with the first drum to a position for transfer by the gate to the second drum.

10. In combination for use with a plurality of cards each having a plurality of bits of information, a pair of rotatable drums each having passageways for the withdrawal of fluid such as air, means operatively coupled to the drums for producing a rotation of the drums, means for producing vacuum effects, means for providing a conduit between the vacuum means and the passageways in each drum for withdrawing fluid from the passageways, there being slots in the periphery of each drum in communication with the passageways for the creation of an inward pressure for retaining the cards individually in fixed position on the drum peripheries, means operatively coupled to a first one of the drums for obtaining an individual transfer of the cards to the first drum for rotation with the drum, means including a gate disposed between the drums and having at least one finger extending into the slotted periphery of the first drum to withdraw each card individually from the drum after its movement through a particular angular distance on the drum for a transfer of the card to the second drum, means operatively coupled to the gate for pivoting the gate to move the finger away from the slotted periphery of the first drum for a movement of the cards with the first drum through a distance greater than the particular angular distance, means for stacking the cards moving with the first drum through a distance greater than the particular angular distance, and means responsive to selective bits of information on the cards moving with the first drum for obtaining a controlled disposition of the gate in the first and second positions at particular times in accordance with the selective bits of information on such cards and upon a movement of the cards with the first drum to the position of transfer by the gate to the second drum.

11. In combination for use with a plurality of cards each having a plurality of bits of information, a plurality of transport means movable in closed loops and constructed to hold the cards in fixed positioning on the transport means for movement of the cards with the transport means and disposed in paired relationship to facilitate a transfer of cards between successive transport means in the plurality, means operatively coupled to the transport means for obtaining a movement in the closed loops of the transport means in the plurality, means including an input stack constructed to hold the cards in stacked relationship and disposed relative to a first transport means in the plurality to obtain an individual transfer of the cards in the input stack in sequence to the first transport means in the plurality, means including a plurality of output stacks each disposed relative to a different one of the transport means in the plurality to obtain a transfer to the output stack of cards moving with the associated transport means, a plurality of gates each disposed between a different pair of transport means in the plurality and each constructed to have first and second operative relationships and to provide for a transfer of cards between the first transport means in the pair and the second transport means in the pair in the first operative relationship of the gate and to provide for a movement of the cards with the first transport means in the pair past the position of transfer to the second transport means in the pair upon the operation of the gate in the second relationship, and means including electrical circuitry responsive to selective bits of information on the cards transferred to the transport means for processing such selective bits of information on the cards moving with the transport means in the plurality to obtain a controlled operation of the different gates in accordance with such processed information and upon a movement of the cards to the position of transfer by the gates for a transfer of the cards to particular output stacks in the plurality dependent upon the processed information.

12. In combination for use with a plurality of cards each having a plurality of bits of information, a plurality of movable transport means each disposed between at least two other transport means in the plurality to provide a paired relationship with such transport means, the transport means in the plurality being constructed to maintain the cards in fixed positioning on the transport means during the movement of the transport means, means operatively coupled to the transport means in the plurality for maintaining the cards in fixed positioning on the transport means during the movement of the transport means, means operatively coupled to the transport means in the plurality for obtaining a movement of the transport means, means including an input stack constructed to hold the cards in stacked relationship and disposed relative to a first transport means in the plurality to provide a sequential transfer of the cards to the first transport means in the plurality, transducing means disposed relative to the first transport means in the plurality to sense particular bits of information on the cards transferred to the first transport means, a plurality of gating means each disposed between a different pair of transport means in the plurality for providing a coupled relationship between a first transport means in the pair and the second transport means in the pair in one operative relationship to obtain a transfer of cards between the first transport means in the pair and the second transport means in the pair and for providing a decoupled relationship between the first transport means in the pair and the second transport means in the pair in a second operative relationship to prevent any transfer of cards from the first transport means in the pair to the second transport means in the pair, means including a plurality of output stacks each disposed relative to an individual one of the transport means in the plurality at a position past the position of transfer of cards from the individual transport means to the paired transport means in the plurality to obtain a transfer to the output stack of the cards moving with the individual transport means past the position of transfer of the cards to the paired transport means, and processing means responsive to the selective bits of information sensed by the transducing means to obtain a controlled operation of each gating means in the first and second relationships at different times related to the movement of the cards by each transport means in the plurality to the position of transfer of the cards to the paired transport means in the plurality for a transfer of the cards to the different output stacks in accordance with the processed information.

13. In combination for use with a plurality of cards each having a plurality of bits of information, first and second transport means each movable in a closed loop and each disposed relative to the other to facilitate a transfer of cards between the first and second transport means and each constructed to maintain cards in fixed position on its periphery for movement of the cards with the transport means, means operatively coupled to the first and second transport means to obtain a fixed disposition of the cards on the transport means, means operatively coupled to the first and second transport means for obtaining a movement of the first and second transport means in closed loops, a gate disposed between the first and second transport means and operative in a first relationship to produce a coupled relationship between the first and second transport means for a transfer of cards from the first transport means to the second transport means and operative in a second relationship to produce a decoupled relationship between the first and second transport means for a movement of the cards with the first transport means past the position of transfer to the second transport means, and means responsive to selective bits of information on the cards transported by the first transport means at a position before the transfer of the cards by the gate to the second transport means for obtaining a controlled operation of the gate at particular times in the first and second relationships in accordance with the selective bits of information on such cards and upon a movement of the cards by the first transport means to the position for transfer by the gate to the second transport means.

14. In combination for use with a plurality of cards each having a plurality of bits of information, first and second transport means each movable in closed loops and disposed relative to the other to facilitate a transfer of cards between the first and second transport means, the first and second transport means being constructed to obtain the production of a vacuum force on the peripheries of the transport means, means operatively coupled to the first and second transport means for producing a vacuum force on the peripheries of the first and second transport means during the movements of the first and second transport means in the closed loops, means operatively coupled to the first and second transport means for obtaining movements of the transport means in closed loops, a gate disposed between the first and second transport means and having a first operative relationship for producing a coupled relationship between the first and second transport means to obtain a transfer of cards from the first transport means to the second transport means and having a second operative relationship for producing a decoupled relationship between the first and second transport means to prevent any transfer of cards from the first transport means to the second transport means, and means including transducing means disposed relative to the first transport means at a position before the transfer of the cards by the gate to the second transport means for processing selective bits of information on such cards to obtain a controlled operation of the gate in its first and second relationships at different times in accordance with such selective bits of information and upon a transport of the cards by the first transport means to the position of transfer by the gate to the second transport means.

15. In combination for use with a plurality of cards each having a plurality of bits of information, first and second movable transport means disposed relative to each other to facilitate a transfer of cards from the first transport means to the second transport means, the first and second transport means being constructed to obtain the production of a vacuum force on the periphery of the first and second transport means, means operatively coupled to the first and second transport means for producing a movement of the first and second transport means, means operatively coupled to the first and second transport means for producing a vacuum force on the periphery of the first and second transport means to retain the cards in fixed position on the transport means during the movement of the transport means, means for providing a transfer of the cards to the first transport means for movement with the transport means, gating means disposed between the first and second transport means and operative in one relationship to exert an individual force on the cards on the first transport means to obtain a transfer of the cards to the second transport means and operative in a second relationship to prevent the exertion of such force on the cards for a continued movement of the cards with the first transport means past the position of transfer to the second transport means, means including a first output stack disposed relative to the cards on the second transport means for obtaining a transfer into the first output stack of the cards transferred to the second transport means, means including a second output stack disposed relative to the cards on the first transport means at a position past the transfer of the cards by the gating means for obtaining a transfer into the second output stack of the cards having a continued movement with the first transport means past the position of transfer by the gating means to the second transport means, and means operatively coupled to the cards transported by the first transport means at a position before the transfer of the cards by the first gating means for processing selective bits of information on such cards to obtain a controlled operation of the gating means in the first and second relationships in accordance with such selective bits of information and upon a transport of the cards by the first transport means to the position of transfer to the second transport means.

16. In combination for use with a plurality of cards each having a plurality of bits of information, first and second transport means movable in closed loops and disposed relative to each other to facilitate the transfer of cards from the first transport means to the second transport means and constructed to retain the cards in fixed position on the transport means during the movement of the transport means, means operatively coupled to the first and second transport means for operating with the first and second transport means to obtain a retention of the cards in fixed position on the first and second transport means, means operatively coupled to the first and second transport means for obtaining a movement of the first and second transport means in the closed loops, a gate disposed between the first and second transport means and operative in one relationship to produce a coupled relationship between the first transport means and the second transport means for a transfer of cards from the first transport means to the second transport means and operative in a second relationship to produce a decoupled relationship between the first transport means and the second transport means for a movement of the cards with the first transport means past the position of transfer to the second transport means, means including a first output stack disposed relative to the cards on the first transport means at a position past the position of transfer of the cards by the gate to the second transport means for obtaining a transfer from the first transport means to the first output stack of the cards moving with the first transport means past the position of transfer to the second transport means and for obtaining a deposit of the cards in the first output stack, means including a second output stack disposed relative to the cards on the second transport means for obtaining a transfer from the second transport means to the second output stack of the cards transferred to the second transport means from the first transport means and for obtaining a deposit of the cards in the second output stack, and means disposed relative to the cards on the first transport means for processing selective bits of information on such cards and for obtaining the operation of the gate in the first relationship at particular times and in the second relationship at other times in accordance with the processed bits of information and upon a transport of the cards by the first transport means to the position for transfer of the cards by the gate to the second transport means.

17. In combination for use with a plurality of cards each having a plurality of bits of information, first and second transport means for the cards and disposed relative to each other to facilitate a transfer of cards between the first and second transport means and constructed to hold the cards on the first and second transport means for movement of the cards by the first and second transport means, a gate disposed between the first and second transport means and operative in a first relationship on the cards on the first transport means to provide a sequential transfer of cards from the first transport means to the second transport means and operative in a second relationship to provide for a continued movement of the cards on the first transport means past the position of transfer of the cards by the gate to the second transport means, transducing means operative upon the cards on the first transport means before the movement of the cards to the position for the transfer of the cards by the gate to the second transport means for sensing particular bits of information on the transported cards on the first transport means, and means responsive to the particular bits of information sensed on the cards on the first transport means for processing such information to obtain an operation of the gate in the first and second relationships in accordance with such processed information and upon the movement of the cards on the first transport means to the position for the transfer of the cards by the gate to the second transport means.

18. The combination set forth in claim 17 in which the first and second transport means are disposed in contiguous relationship and in which the gate is disposed between the first and second transport means at the position of contiguity between the first and second transport means.

19. In combination for use with a plurality of cards each having a plurality of bits of information, first and second transport means for the cards and disposed relative to each other to facilitate a transfer of cards between the first and second transport means and constructed to hold the cards on the first and second transport means for individual movement of the cards by the first and second transport means, a gate disposed between the first and second transport means and operative in a first relationship to obtain a sequential transfer of cards from the first transport means to the second transport means and operative in a second relationship to obtain a retention of the cards on the first transport means for movement of the cards past the position of transfer of the cards to the second transport means, first receiving means disposed relative to the first transport means at a position past the position of transfer of the cards from the first transport means to the second transport means for obtaining a transfer of cards from the first transport means to the first receiving means upon an operation of the gate in the second relationship, second receiving means disposed relative to the second transport means for obtaining a transfer to the second receiving means of the cards transferred from the first transport means to the second transport means, electrical circuitry including transducing means operative upon the cards on the first transport means at a position before the position of transfer of the cards from the first transport means to the second transport means for sensing selective bits of information on such cards, and electrical circuitry responsive to the selective bits of information sensed on each card to obtain an operation of the gate in the first and second relationships at different times in accordance with such sensed information and upon the movement of the cards to the position for the transfer of the cards by the gate from the first transport means to the second transport means.

20. The combination set forth in claim 19 in which the first and second transport means are disposed in contiguous relationship to each other and in which the gate is disposed between the first and second transport means at the position of contiguity between the first and second transport means.

21. The combination set forth in claim 12 in which each transport means in the plurality is disposed between two other transport means in the plurality and in which the transport means in each pair are disposed in contiguous relationship and in which each gating means in the plurality is disposed between a different pair of the transport means in the plurality at the position of contiguity between the pair of transport means.

22. In combination for use with a plurality of cards each having a plurality of bits of information, a plurality of transport means for the cards, each transport means in the plurality being constructed to individually hold the cards on the transport means for movement by the transport means, each transport means in the plurality being disposed in paired relationship with respect to particular ones of the other transport means in the plurality to facilitate a transfer of cards between that transport means and the particular ones of the other transport means in the plurality, a plurality of gating means each disposed between a different pair of the transport means in the plurality and operative in a first relationship to obtain a transfer of cards from a first one of the transport means in the pair and operative in a second relationship to prevent such a transfer of cards from the first transport means in the pair to the other transport means in the pair and to obtain an individual retention of the cards on the first transport means in the pair for continued transport of the cards, an input stack constructed to hold a plurality of cards, means operative upon the cards in the input stack for providing a controlled transfer of cards from the input stack to a first one of the transport means in the plurality, means including a plurality of output stacks each disposed relative to a different one of the transport means in the plurality at a position past the particular one of the gating means in the plurality associated with that transport means for obtaining a transfer into the output stack of the cards transported by the associated transport means past the associated gating means, transducing means operative upon the cards on the first transport means for sensing selective bits of information on the cards, and means including electrical circuitry responsive to the selective bits of information sensed on the cards on the first transport means and operative upon the different gating means in the plurality upon a movement of the cards to the position for transfer of the cards by the gating means and in accordance with such sensed information to obtain a transfer of each card to a particular one of the output stacks in accordance with such sensed information.

23. The combination set forth in claim 19 in which each transport means in the plurality is disposed between two other transport means in the plurality and in which the transport means in each pair are disposed in contiguous relationship and in which each gating means in the plurality is disposed between a different pair of transport means in the plurality at the position of contiguity between the pair of transport means.

References Cited in the file of this patent

UNITED STATES PATENTS

| | | |
|---|---|---|
| 1,710,691 | Carroll | Apr. 30, 1929 |
| 2,369,794 | Phinney et al. | Feb. 20, 1945 |
| 2,620,924 | Kusters | Dec. 9, 1952 |
| 2,686,052 | Wenkler | Aug. 10, 1954 |
| 2,752,154 | Nelson | June 26, 1956 |
| 2,795,328 | Tyler | June 11, 1957 |